US010866987B2

(12) United States Patent
Manning et al.

(10) Patent No.: US 10,866,987 B2
(45) Date of Patent: Dec. 15, 2020

(54) EVALUATING PERFORMANCE OF RECOMMENDER SYSTEM

(71) Applicant: RCRDCLUB Corporation, New York, NY (US)

(72) Inventors: Damian Franken Manning, New York, NY (US); Omar Emad Shams, Jersey City, NJ (US); Samuel Evan Sandberg, Brooklyn, NY (US)

(73) Assignee: RCRDCLUB Corporation, New York, NY (US)

(*) Notice: Subject to any disclaimer, the term of this patent is extended or adjusted under 35 U.S.C. 154(b) by 190 days.

(21) Appl. No.: 15/225,701

(22) Filed: Aug. 1, 2016

(65) Prior Publication Data

US 2017/0031920 A1 Feb. 2, 2017

Related U.S. Application Data

(60) Provisional application No. 62/199,334, filed on Jul. 31, 2015.

(51) Int. Cl.

| | |
|---|---|
| *G06F 16/635* | (2019.01) |
| *G06F 16/9535* | (2019.01) |
| *G06Q 30/06* | (2012.01) |
| *G06F 16/435* | (2019.01) |
| *G06F 16/904* | (2019.01) |
| *G06Q 30/02* | (2012.01) |

(52) U.S. Cl.
CPC .......... *G06F 16/635* (2019.01); *G06F 16/435* (2019.01); *G06F 16/904* (2019.01); *G06F 16/9535* (2019.01); *G06Q 30/0242* (2013.01); *G06Q 30/0251* (2013.01); *G06Q 30/0631* (2013.01)

(58) Field of Classification Search
None
See application file for complete search history.

(56) References Cited

U.S. PATENT DOCUMENTS 7,958,119 B2 * 6/2011 Eggink ............. G06F 17/30702
707/732
2003/0221541 A1 * 12/2003 Platt ................. G06F 17/30038
84/609

(Continued)

OTHER PUBLICATIONS

International Search Report and Written Opinion dated Nov. 15, 2016 as received in Application No. PCT/US2016/045057.

*Primary Examiner* — Giuseppi Giuliani
(74) *Attorney, Agent, or Firm* — Butzel Long

(57) ABSTRACT

In a method for evaluating a performance of a recommender system, a session of M content items consumed by a user can be identified. The session can be defined such that, for each of a first (M-1) content items in the session, a delay time between a completion of consumption of one of the first (M-1) content items and a commencement of consumption of a directly next content item in the session is less than a predetermined duration of time. Content items in a content item-base can be ranked, based on the first (M-1) content items, according to a likelihood of each content item in the content item-base to be consumed next. A session metric can be generated for each content item in the content item-base. The recommender system can be trained based on the session metric for the Mth content item.

7 Claims, 30 Drawing Sheets

(56) References Cited

U.S. PATENT DOCUMENTS

| | | | |
|---|---|---|---|
| 2006/0020662 A1* | 1/2006 | Robinson | G06F 15/16 |
| | | | 709/203 |
| 2011/0153663 A1 | 6/2011 | Koren | |
| 2011/0314039 A1* | 12/2011 | Zheleva | G06F 17/30035 |
| | | | 707/767 |
| 2014/0280213 A1* | 9/2014 | Isquith | G06Q 30/0202 |
| | | | 707/748 |
| 2015/0187024 A1 | 7/2015 | Karatzoglou | |
| 2015/0277849 A1* | 10/2015 | Beaumier | G06F 16/64 |
| | | | 715/716 |

* cited by examiner

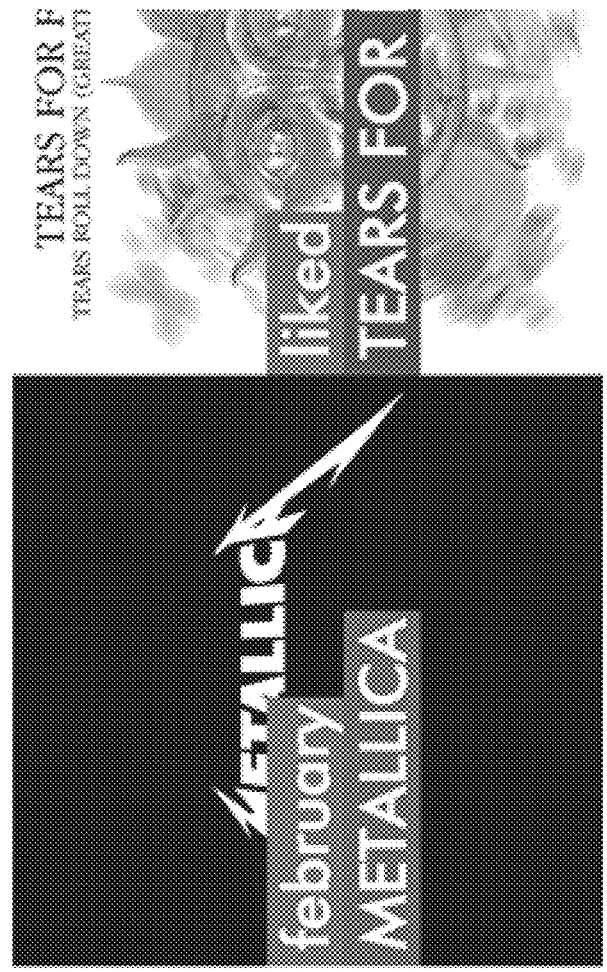
FIG. 8

EVALUATING PERFORMANCE OF RECOMMENDER SYSTEM

CROSS-REFERENCE TO RELATED APPLICATIONS

This application claims, under 35 U.S.C. § 119(e), the benefit of U.S. Provisional Application No. 62/199,334, filed Jul. 31, 2015, the disclosure of which is incorporated by reference in its entirety.

BACKGROUND

Music recommender systems are sometimes trained offline periodically because the training process can be time consuming. While sometimes providing adequate results for overall tastes, such systems do not respond well to immediate input in live sessions. Such dynamic, online systems often operate on heuristics or guess-work. Further, little effort is typically given to testing dynamic systems.

BRIEF DESCRIPTION OF THE DRAWINGS

The accompanying drawings, which are included to provide a further understanding of the disclosed subject matter, are incorporated in and constitute a part of this specification. The drawings also illustrate aspects of the disclosed subject matter and together with the detailed description serve to explain the principles of as of the disclosed subject matter. No attempt is made to show structural details in more detail than may be necessary for a fundamental understanding of the disclosed subject matter and various ways in which it can be practiced.

FIG. 8 is a diagram that illustrates examples of seeds.

DETAILED DESCRIPTION

Aspects disclosed herein relate to evaluating in real-time or near real-time the performance of a recommendation system, also known as a recommendation engine. The content items in a content item-base can be ranked by the engine based on content items actually consumed by the user. The ranking can represent the predicted likelihood for each content item in the content item-base that the user will consume next to that content item.

General Overview of Recommendation Systems

Figure 1:
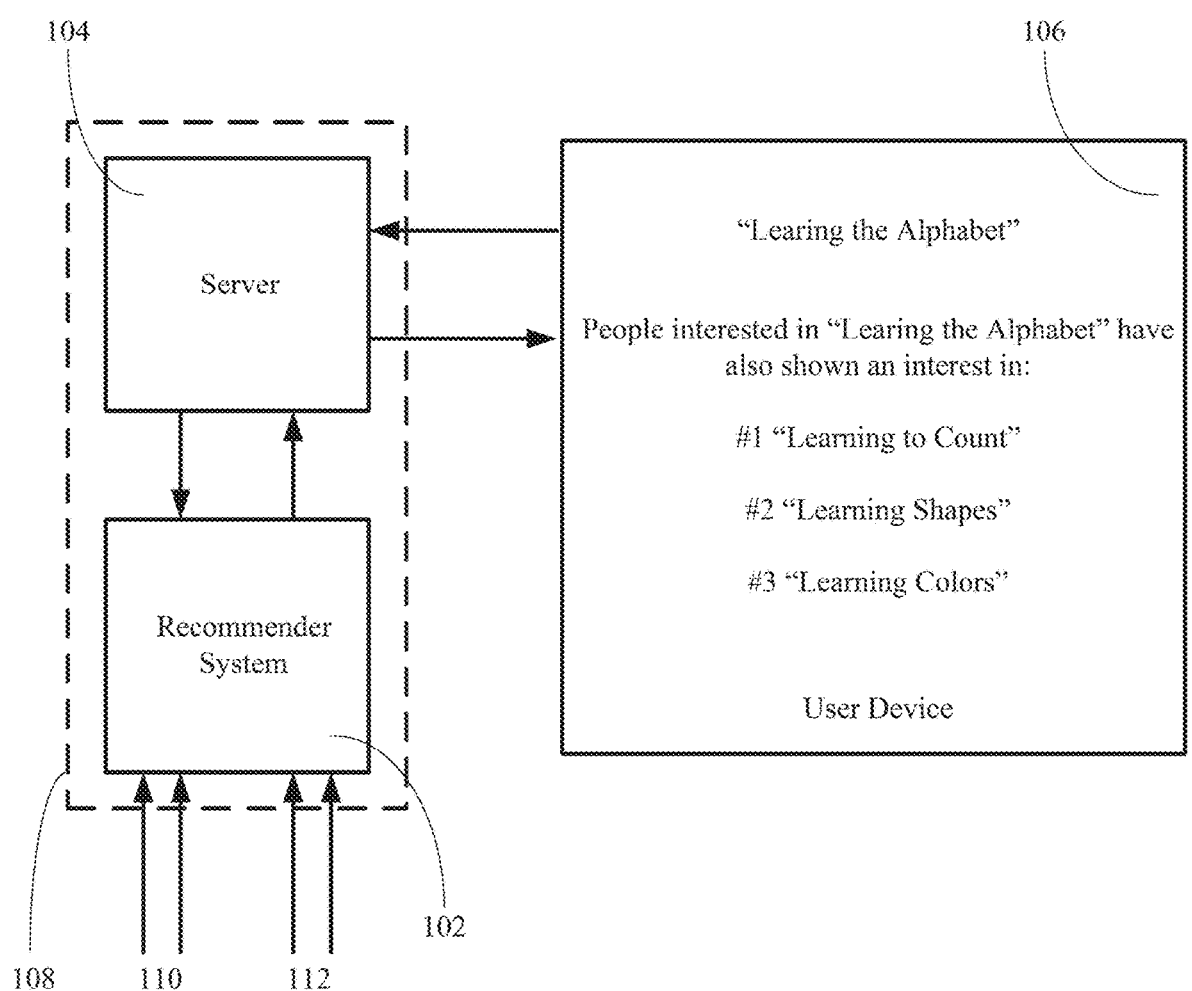
FIG. 1 is a diagram illustrating an example of an environment in which a recommender system can operate.

FIG. 1 is a diagram illustrating an example of an environment 100 in which such a recommender system 102 can operate. The environment 100 can include, for example, the recommender system 102, a server 104, and a user device 106. In an aspect, the recommender system 102 and the server 104 can be combined in a sever 108. The recommender system 102 can be configured to receive live input from users as well as various attributes 110 and information about items 112. The live input from users can include the amount of time a user spends listening to a given song, such as a song being played to the user from a list of songs recommended by the system. The information about the items 112 can be information about items that are candidates for inclusion in the lists of recommendations. The various attributes 110 and the information about the items 112 can include information, by way of example and not be way of limitation, about preferences or ratings of items by users, demographic information about users, characteristics of the items, preferences or ratings of these characteristics by users, needs or preferences of users with respect to these characteristics, the like, or any combination thereof.

Figure 2:
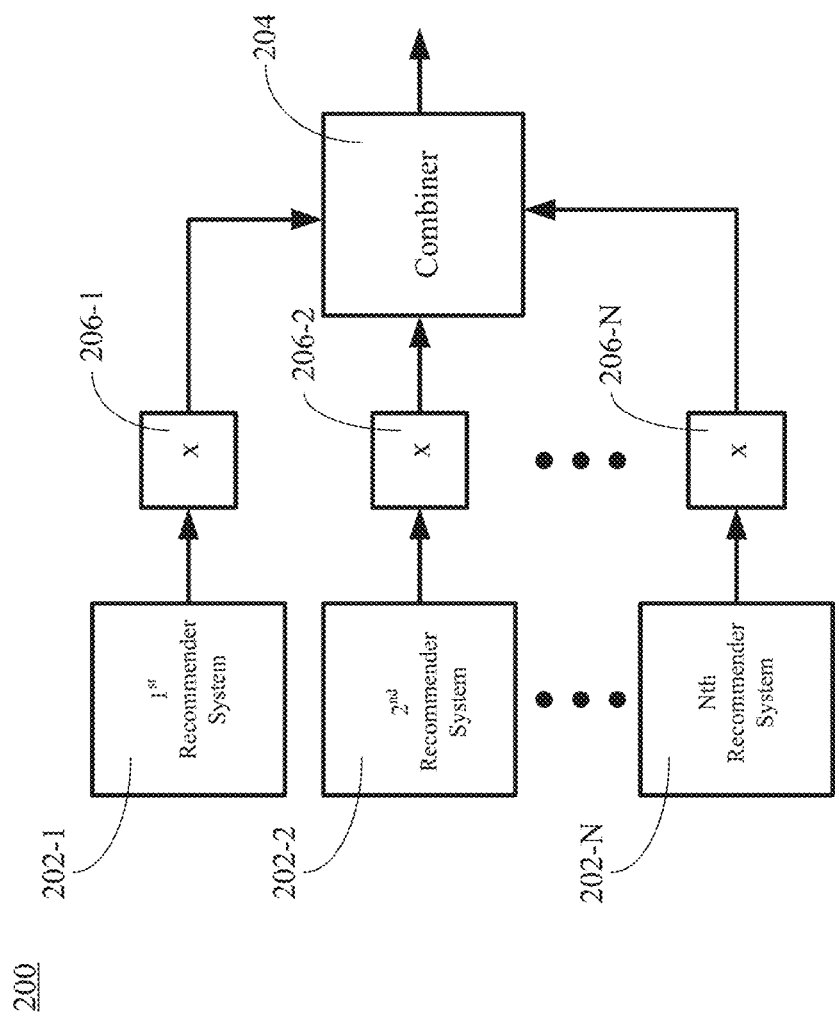
FIG. 2 is a diagram illustrating an example of a hybrid recommender system.

A hybrid recommender system can include any of a variety of recommender systems and produce lists of recommendations based on a combination of the variety of recommender systems. FIG. 2 is a diagram illustrating an example of a hybrid recommender system 200. The hybrid recommendation system 200 can include, for example, a recommender system 202-1, one or more other recommender systems 202-2, . . . , 202-N, and a combiner 204.

In an aspect, each of the recommender systems 202-1, 202-2, . . . , 202-N can be different from each other of the recommender systems 202-1, 202-2, . . . , 202-N. For example, the recommender system 202-1 can be any of a collaborative recommender system, a demographic recommender system, a content-based recommender system, a knowledge-based recommender system, a dynamic recommender system, an offline recommender system, or a context-aware recommender system. Likewise, the recommender system 202-2 can be any of a collaborative recommender system, a demographic recommender system, a content-based recommender system, a knowledge-based recommender system, a dynamic recommender system, an offline recommender system, or a context-aware recommender system. Typically, but not necessarily, the type of the recommender system 202-2 can be different from the type of the recommender system 202-1. Recommendation inputs from each different recommender system can be weighted and combined to form an overall recommendation for content. A session metric, for example, can quantify the quality of recommendations that can be made based on in-session information. In-session information can be associated with a session window. A session window can be a portion of a content item consumption history of a user in which several content items have been consumed within a defined short period of time. The session metric can be used to adjust the weights by determining which outputs are most accurate for a given session for a given user. Further, the session metric can be recalculated each time the session window changes, i.e., one or more songs are added or deleted from the session (e.g., the songs advance as the user finishes listening), or the criteria applied to define the session window changes. For example the session window may be initially defined as in the above example, and then be dynamically redefined to include only songs that were listened to by a user with no longer than a twenty second pause between listens.

The hybrid recommender system 200 can include a weight 206-1 and one or more other weights 206-2, . . . , 206-N. Each of the weights 206-1, 206-2, . . . , 206-N can be associated with a corresponding one of the recommender systems 202-1, 202-2, . . . , 202-N. Each of the weights 206-1, 206-2, . . . , 206-N can be configured to receive, as an input, an output from the corresponding one of the recommender systems 202-1, 202-2, . . . , 202-N. Each of the weights 206-1, 206-2, . . . , 206-N can be combined to produce a single output. The output of each of the weights 206-1, 206-2, . . . , 206-N can be used in the combiner 204 to produce a single output.

In an aspect, if the hybrid recommender system 200 includes the weights 206-1, 206-2, . . . , 206-N, then, prior to an initial deployment of the hybrid recommender system 200, the hybrid recommender system 200 can be trained to determine each of the weight values via a technique such as a technique used in neural networks.

The combiner 204 can be configured to receive, as inputs, an output from each of the recommender systems 202-1, 202-2, . . . , 202-N and to produce a combined output. The output from each of the recommender systems 202-1, 202-2, . . . , 202-N can be used in the combiner 204. Alternatively, if the hybrid recommender system 200 includes the weights 206-1, 206-2, . . . , 206-N, then the output from each of the weights 206-1, 206-2, . . . , 206-N can an input to the combiner 204.

The combiner 204 can produce the combined output using any of a variety of techniques. For example, the combiner 204 can produce the combined output by aggregating the outputs from the recommender systems 202-1, 202-2, . . . , 202-N. For example, the combiner 204 can produce the combined output by numerically combining the weighted outputs from the recommender systems 202-1, 202-2, . . . , 202-N. For example, the combiner 204 can produce the combined output by using switches so that the combined output includes the output of one or more of the recommender systems 202-1, 202-2, . . . , 202-N, but excludes the output of one or more other the recommender systems 202-1, 202-2, . . . , 202-N.

This process can be performed to adjust correlation models used in a recommender system prior to an initial deployment of the recommender system. The process can be performed periodically to readjust the correlation models in response to changing tastes of a user. Furthermore, if the recommender system is a hybrid recommender system that includes multipliers so that different weight values can be applied to the outputs of the component recommender systems, then this process can be expanded to include training the hybrid recommender system both prior to an initial deployment and periodically to account for the subjective nature of what constitutes a "good" recommendation and the changing preferences of users over time.

Recommendation System

Figure 3:
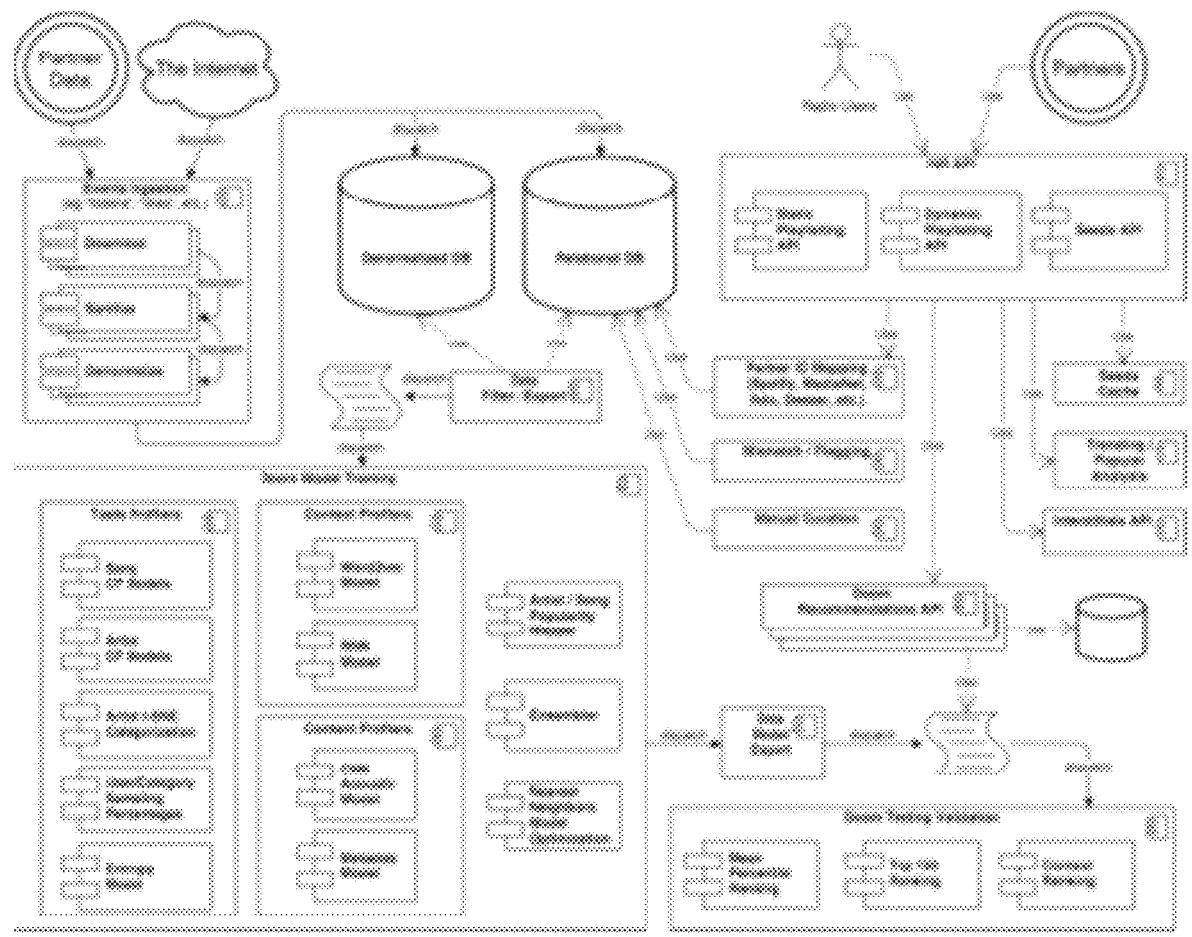
FIG. 3 is a block diagram illustrating an example of a recommendation system according to aspects disclosed herein.

FIG. 3 is a block diagram illustrating an example of a recommendation system according to aspects disclosed herein. The recommendation framework can be encapsulated in a service layer. The architecture of the recommendation framework can abstract various models and profilers so that models can be easily added and/or subtracted and the weights of the models can be adjusted dynamically. The service layer can also manage training and evaluation of the models in a systematic manner.

Taste Profiler

A Collaborative Filtering approach can be used to determine a taste profile of a user. Collaborative Filtering (CF) can construct a user vector $\vec{v}_u$ and an item vector $\vec{v}_l$, for users u, and items i, respectively. Items can be, for example, a song or an artist depending on the use case. A closeness of a dot product of a given user vector with a particular item vector can be an indication of a likelihood that the given user is interested in that particular item. A training process can be constructed to minimize the sum:

$$\Sigma_i (M_{u,s} - \vec{v}_u \cdot \vec{v}_l)^2$$

The training process can act so that the dot product of a given user vector $\vec{v}_u$ and a given item vector $\vec{v}_l$ can be close to the original matrix element $M_{u,i}$ However, a situation in which a perfect match between the matrix and dot product is not realized can present an opportunity to fill in the matrix with non-zero weights (the dot product between the user and item vectors) and effectively desparsify the matrix. In this manner, items that a user might be interested in can be predicted even if the user had not previously interacted with one or more of the predicted items. This can allow a ranked list of items to be produced for each user. This ranked list can also be useful for testing purposes.

Collaborative Filtering can be used in a context of logistic regression. Logistic regression can have the advantage of providing a probability for a given user to listen to a given item i:

$$p_{u,i} = \frac{\exp(\vec{v}_u \cdot \vec{v}_i)}{\exp(\vec{v}_u \cdot \vec{v}_i) + 1}$$

where $p_{u,i}$ is the probability of user u listening to item i. Optionally, a bias term can be included in the argument of the exponential above. This can account for popularity bias of given users and given items.

Training can occur by alternately modifying the user and item vectors and minimizing error via gradient descent. This can entail computing partial derivatives with variable step sizes. The partial derivatives can then be used to update the user and item vectors. This can be parallelized for optimization so parts of the calculation can be mapped out to different processors, and finally reduced by adding derivatives together at the end of every gradient descent cycle.

Cold Start

A music recommendation framework can suffer from a so-called "cold start problem" in which a user must listen to enough music in order for a high quality music recommendation to be produced. This typically can require offline training and a sufficient quantity of listens.

According to aspects disclosed herein, the "cold start problem" can be circumvented by producing an online taste profile by dynamically adding the Collaborative Filtering item vectors of items the user listens to in one or more categories and normalizing the resultant vectors in at least one of the one or more categories to unit norm. This approach can avoid grouping songs together that may be unlikely to be consumed together. A new user can typically explore distinct categories before honing in on preferred styles.

At least one appropriate category can be sampled according to the weight of that category for the user as defined in the section on 'Category Creation' in which a Dirichlet distribution can be used to model user interest in different genres of music.

Vectors produced in this manner can define an orientation that can provide a form of naïve personalization.

A Collaborative Filtering vector can be maintained for users with established offline profiles. Profiles for such users can be updated with the sum of the vector representation of songs they listen to online, but inversely proportional to the total listens of the user so as to not unduly perturb established profiles.

Users with no listen history can benefit from both popularity based filtering and demographic based filtering as described below. A description of adjusting by number of listens is also described below.

Context Profiler

Items interacted with in-session can define a context that can be profiled. This can allow items to be suggested that suit each unique session. Thus recommendations can be produced as a function of only session activity.

Context-Based Filtering (CBF) can be used, when a consumer selects a seed, to produce a potential pool of songs that could follow the seed. This pool of songs can be generated by calculating the expected state of the listener with a Dynamic State Learner.

Dynamic State Learner

Songs can have a latent vector representation in one or more of the disclosed models. Users can trigger different explicit feedback events, such as a like and skip, and other implicit events can occur, including a full or partial listen. Using the Dynamic State Learner, an estimate can be made of the expected state of a listener at time t. This can be denoted as $E_t$ for time step t. This can allow songs to be recommended that are close to this expected state. The formula can be as follows:

$$E_t = \gamma E_{t-1} + \Delta_t$$

where $\Delta_t = s_t$ can be a listen, $\Delta_t = \beta(\tau)s_t$ can be a song skipped $\tau$ seconds into a listen, $\Delta_t = (\alpha + \beta(\tau))s_t$ can be a song that is liked and skipped $\tau$ seconds into a listen, and $s_t$ can be the state (vector) of the song listened to. $\beta(\tau)$ can be the weight to count a song that has been listened to for $\tau$ seconds. This can be negative, in general, for short times and close to one for longer ones. $\alpha$ can be the additional weight that applies due to a like.

A weighted approach to updating the likely state of a user can be used for a listen, like, or skip. These weights may not be placed in an ad hoc fashion but rather can be "learned" by training the model on historical data. Furthermore, the model can have the very mild assumption that each a state is a slightly weakened form of the old state (via the $\gamma$ factor) plus a correction term $\Delta_t$.

A version of the model can be applied in the middle of a session (in medias res) and can be copied for when a user first selects a seed track, and finally when the user switches between seed tracks.

The Dynamic State Learner can enable generation of the most relevant pool of candidate songs. These candidates can then be filtered for acoustic properties. To increase variety, songs from an artist just played can typically be pushed down the pool. Songs that have already been played in the session can also be filtered out.

Dynamic Pooling

Using the expected state for one or more models, a potential pool of 100 songs, for example, that could follow the seed song can be produced. As a user listens to more songs, a number of modifications can be made to this pool. For example:

1. Sort the pool by probability based on most recent listens as defined by the item's expected state.
2. For a like, songs similar to the liked song can be added to the pool. This can be based on nearest neighbors, which can find potent idiosyncratic local similarities between individual songs.
3. For a full listen, songs similar to that song in the pool can be added in the same way, applying the updated expected state.
4. When a user skips, songs similar to the skipped one can be removed from the pool. The exact number of which and similarity threshold can be relative to the number of skips in recent session history. In response to the skip, a familiar song can also be added to the top of the pool.
5. Of the top songs in the pool, an acoustic similarity to the previous song can be sought to ensure smooth transitions in a playlist.

If a listener's entropy is high enough to indicate less popular tastes or a large number of listens, the next song can be selected to match the user's typical popularity taste as described in the popularity filtering section.

Word2Vec word2vec can be a Context-Based Filtering system used in the models disclosed herein. An algorithm traditionally used to represent words as vectors, word2vec can construct a matrix of words vs. contexts for those words. Contexts can be defined by a window around a word, typically comprising a few words around a given word. Word2vec can construct vectors for a word. The closer the orientation of two vector representations of two different words, the closer (in principal) the association between those two words can be.

Word2vec can also be quite powerful for analogies; a famous example being King:x as Man:Women, yields x=Queen. This computation can be done by computing $\vec{c}$= 'king'+'woman'−'man' and then finding the closest word as defined by its vector's orientation to c, in this case $\vec{c}$∼ 'queen'.

This system can be used for songs. A song can be treated as a word, and songs can be played subsequently as words following each other. Furthermore, session windows can be calculated that fit naturally with how music tends to be consumed.

The ability to project meaningful contexts and analogies can be useful ability. Vectors can be subtracted while maintaining an ability to derive meaningful recommendations. For example, someone who likes Jay-Z, but not Drake, can have their playlists tailored accordingly.

Acoustic Analysis

Using a variety of acoustic signatures, such as tempo, loudness, and energy for a song, a metric for song-song acoustic similarity can be defined. This can allow a narrow pool of songs to be ordered by acoustic properties to produce seamless song-to-song transitions based on accepted thresholds demonstrated by real, consumption driven historical models.

Convolutional Neural Networks

Figure 4:
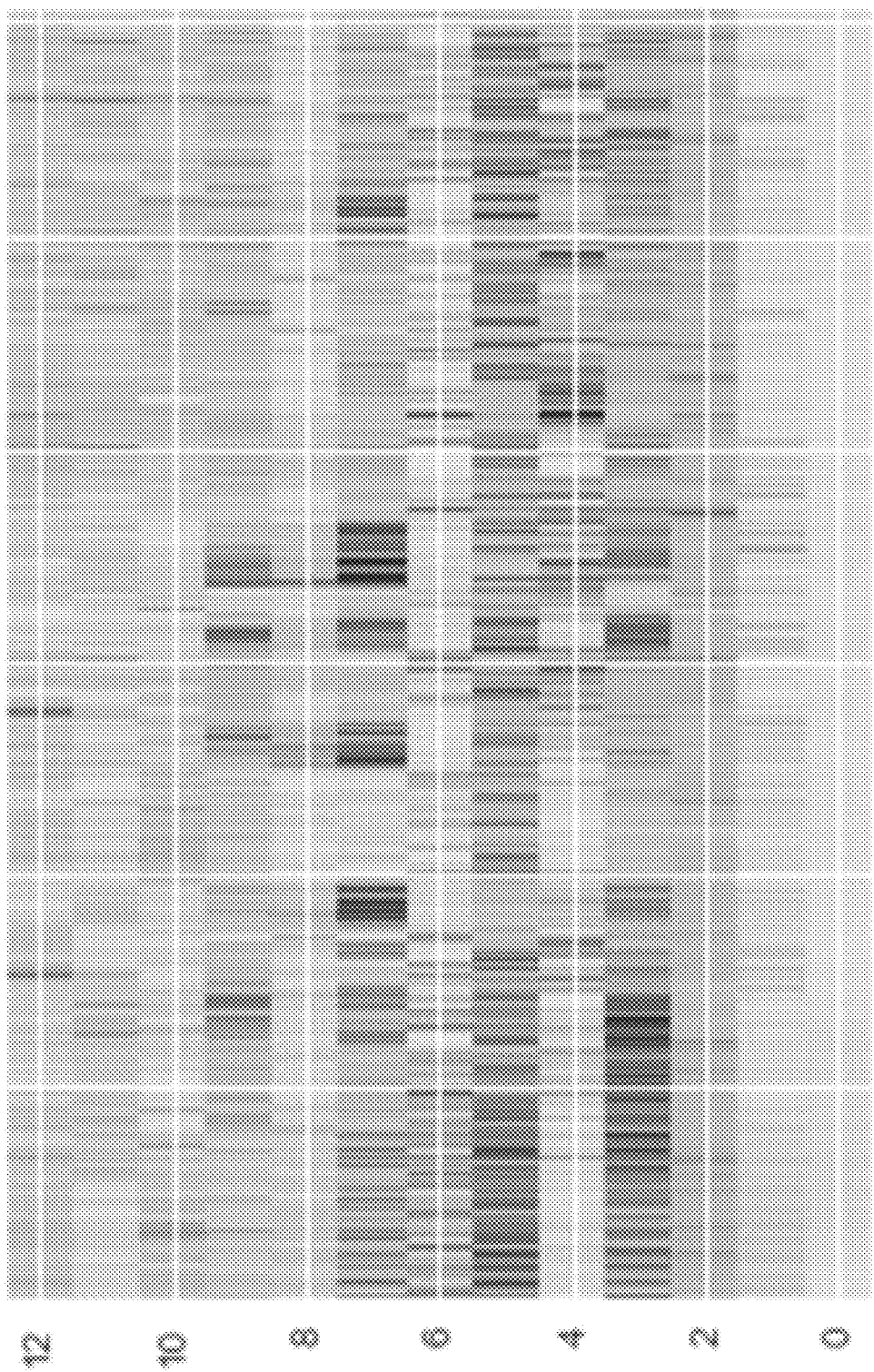
FIG. 4 illustrates a Mel frequency cepstrum representation of a 30 s song sample.

A Convolutional Neural Network (CNN) can be trained on acoustic information in a manner similar to how this would be done on image data. A song can be represented, for example, by a 2d spectrogram, typically thirteen or more frequency bands vs 30 seconds of time. FIG. 4 illustrates a Mel frequency cepstrum representation of a 30 s song sample. The frequency bands are vertical.

A 1d convolution can be performed along the time axis, applying a max pooling operation. A number of these layers can be applied consecutively. The final layer of the network can be trained to identify the genre of a song solely from acoustic information based in the Mel frequency cepstrum.

A latent representation of a song can be constructed from a hidden layer in the convolutional neural network and can be used as a vector representation of the acoustic properties of that song. With a vector that represents the acoustic properties of every song, an acoustic vector model can be ensembled with other models to provide acoustic smoothing and to amplify unique features that may be particularly desirable to the listener.

This approach can have the benefit of including songs for which no previous consumption data are available such as, for example, new releases and songs by new artists. This approach can effectively solve the cold start problem for new music.

Recurrent Neural Networks

Recurrent Neural Networks (RNN) can accurately predict sequences of items. A neural network can be trained on a sequence of songs, where the hidden layer output can be used as input in the next run (hence the 'recurrent' nomenclature). By taking a window representing a sequence and training the neural network to predict a window that is slightly temporally shifted, the model can output the most probable song to follow in a listening session.

A RNN as disclosed herein can be trained on the vector representation of the songs in the system as given by the word2vec vector representation of songs in session. This representation can allow for more global learning of song sequences and can produce the RNN model to predict a vector representing the most likely state of the following song.

Lookups, Nearest-Neighbors, Local Tastes

There can be several pitfalls with naive implementations of both Collaborative Filtering and Context-Based Filtering technologies:

1. In searching for relevant songs or artists, typically the dot product/orientation can be computed for one or more songs, against an input vector $\vec{x}$ interest. In some situations there may be an interest in the top matches to $\vec{x}$. For at least this reason, computing the dot product against all items can be grossly inefficient, especially as the population of items grows.
2. Latent factor models such as, for example, CF can be highly effective at detecting gross structures in datasets. However, latent factor models may be less effective at detecting strong associations between smaller groups of items. Nearest neighbor models can be more effective at detecting strong associations between smaller groups of items.

To address these concerns, nearest neighbors can be used that hash item vectors into buckets. Partitioning items and subsequently hashing can allow for quick return of nearest neighbors by speeding up lookup time using hashes based on pre-computed nearest neighbors.

Figure 5:
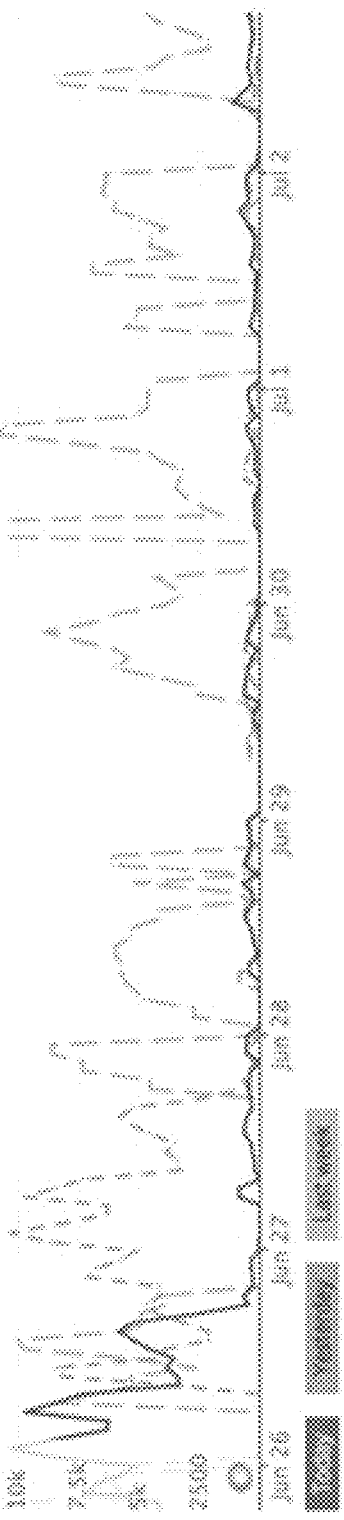
FIG. 5 is a graph of a comparison of response time with (solid line) and without (dotted line) Hashed Nearest Neighbors.

FIG. 5 is a graph of a comparison of response time with (solid line) and without (dotted line) Hashed Nearest Neighbors. Using Hashed Nearest Neighbors on the 2d t-SNE projection of artist vectors can be effective for addressing the issue with detecting strong associations between smaller groups of items. This two dimensional space can allow use of the natural clustering property of t-SNE to find smaller specific relationships between songs.

Ensembler

The "perfect song" can be defined to exist at the intersection of the active user's taste profile and the active session context profile. For at least this reason, the ensembling framework can include both a linear ensemble and a non-linear ensembler.

Linear Ensembler

Recommendation systems as disclosed herein can be combined by deploying a cross-validated weighting of songs across models. Nearest neighbors can be generated for both the vector representing the user profile and the vector representations of the various context based models. The union of the set of nearest neighbors of these vectors can be defined as a song candidate pool, which can be ranked under one or more models.

The model rankings can be used to generate a master ranking via a weighted average of ranks of the RNN, CNN, word2vec, and Collaborative Filtering models. The weights can be discovered through cross-validation. This approach can allow a system to complement one or more other systems to predict the most likely song for the user considering their taste and context.

Nonlinear Ensembling

In some cases, after generating a candidate pool of songs as described in the linear ensembler section, these songs can be scored via a gradient boosting tree. A weighted-average of the scores of the non-linear and linear ensembler can be computed with cross-validated weights.

Using boosting trees from the eXtreme Gradient Boosting (XGBoost) library, the likelihood that a given user, in a specific session (represented by a dynamic state $\vec{E}$ (as described in section on "Dynamic State Learner")) will be more likely to skip or listen to a potential song s can be predicted. The song s with the greatest appeal can then be selected.

Two inputs can be used to construct the feature space to train this ensembler. The first input can be the dynamic state of the user, represented by the concatenation of the dynamic vector state of each model:

$$\vec{E}_{concat.}=(\vec{E}_1, \vec{E}_2, \ldots, \vec{E}_N)$$

where $\vec{E}_i$ can be the dynamic vector state of model i and where i can be an index that runs over all N models used. Similarly, a concatenated state can be defined to represent the potential song to recommend labeled by s:

$$\vec{s}_{concat.}=(\vec{s}_1, \vec{s}_2, \ldots, \vec{s}_N)$$

In general, it may not be possible to find a song s, with vectors $\vec{s}_i$, that can be exactly equal to all $\vec{E}_i$. In a linear ensemble, a weighted approach can be used to try to satisfy the difference:

$$\vec{\Delta}_{concat.}=(\vec{\Delta}_1, \vec{\Delta}_2, \ldots, \vec{\Delta}_N)$$

where $\vec{\Delta}_i=\vec{E}_i-\vec{s}_i$, as a weighted approach can penalize some differences more than others.

However, with XGBoost, nonlinear relations in the differences in the service of predicting a binary response function can be exploited (e.g., typically thumbs data (up vs. down) or whether or not a song was explicitly skipped).

Thus, by using the set of dynamic states $\vec{\Delta}_{concat.}$ as the feature space and an output/response of like and skip activity, a nonlinear ensembler can be trained that can optimize the probability of a positive response. This solution can be applied at the bottom of the machine learning stack, after the linear ensembler and nearest-neighbor layers have reduced the item candidate pool to a trivial number.

The relative importance of weights can be inferred from the sum of the feature importances for a model's vector differences.

Figure 6:
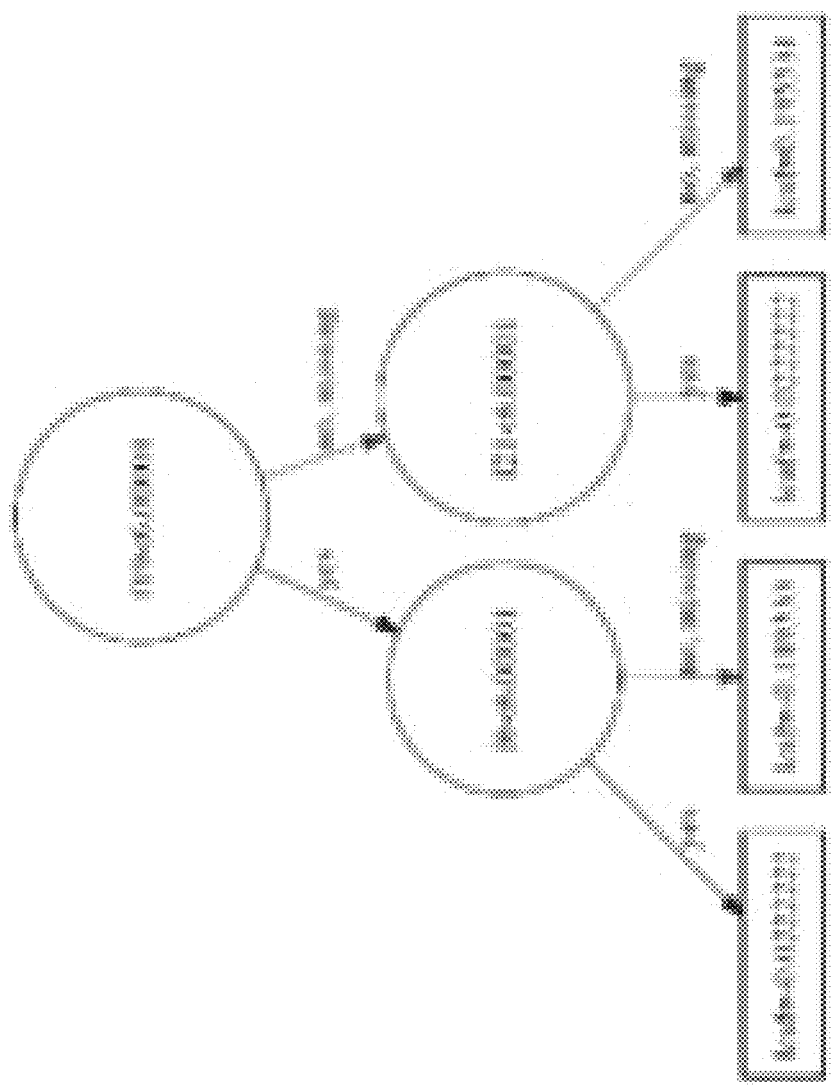
FIG. 6 is a diagram illustrating an example of the non-linearities that can be discovered by XGBoost.

FIG. 6 is a diagram illustrating an example of the non-linearities that can be discovered by XGBoost.

Figure 7:
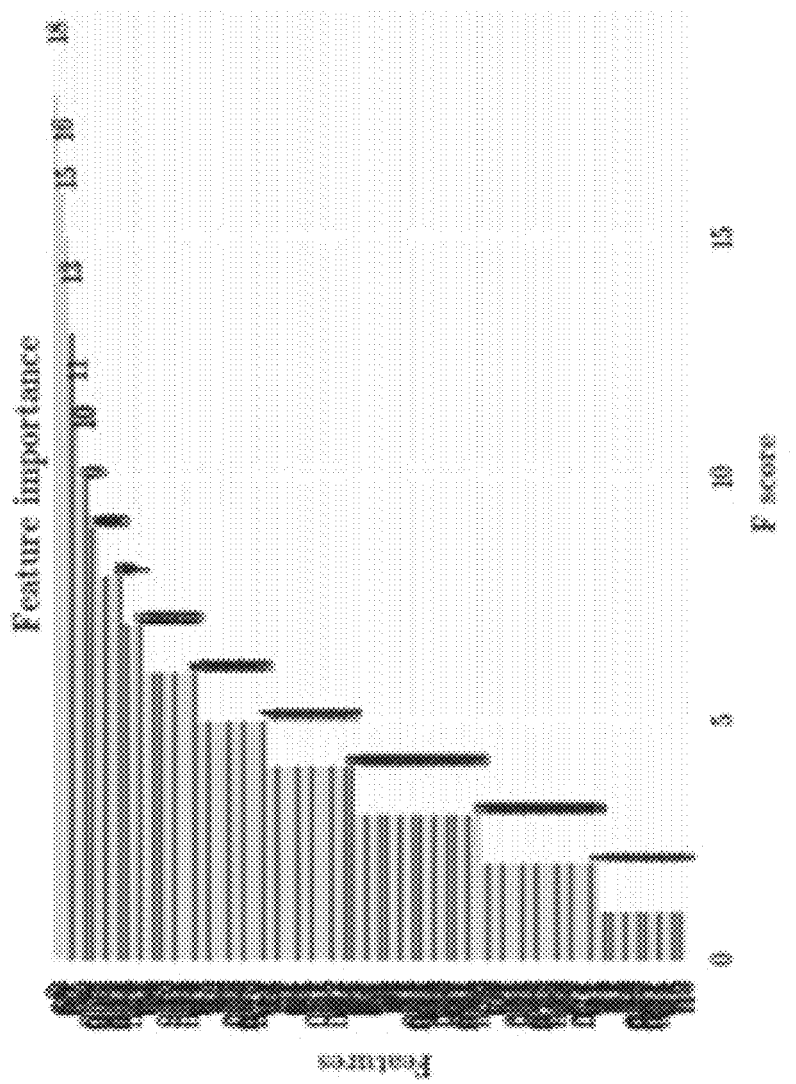
FIG. 7 is a graph illustrating feature importance for a concatenation of model vectors.

FIG. 7 is a graph illustrating feature importance for a concatenation of model vectors.

The nonlinear ensembler can be augmented by including categoricals. These categorical values can include song popularity quantiles which can allow tracking of the true distribution of song listens in listening session with a few numbers and also that of candidate song(s) popularity. Additionally, the categorical values can include song release date and computed acoustic properties such as BPM and loudness for both the session and candidate song.

XGBoost can then appropriately balance popularity, release date, and other categoricals depending on the expected state of the user. This can be especially useful in song vector-space corners that are less information rich or popular.

Seed Generator

According to systems disclosed herein, seeds can be presented through a wall of panels in a front end of the system. A seed can represent a different song to jump start a listening session. FIG. 8 is a diagram that illustrates examples of seeds.

Seeds can fall into three categories:
Curated—Curated seeds can be picked in a non-algorithmic approach.

Activity—A portion of seeds can be based on recent listening history and explicit feedback activity. This can be important for achieving familiarity and relevance.

Recommended—With inputs comprising one or more user taste profiles, songs, and/or artists, recommended seeds can be displayed.

Leveraging a machine learning stack, these seeds can follow a reinforcement learning paradigm. That is, recommended seeds can balance exploitation of what is known about a user vs. exploring the space of songs in an intelligent fashion. Exploration can allow for a natural variety that can cover varying moods and musical tastes intra-user.

Typically, a discrete rule based approach for reinforcement learning can be used in which, with some large probability, exploitation can be conducted (e.g., familiar "slot machines" with high pay-out are displayed) and, with some small probability, exploration can be conducted (e.g., promising new "slot machines" are played).

For the discrete seed types described below, explicit probabilities of showing the various types can be used. A morally similar system in a waterfall approach to picking the major seed categories above can be used. However, using a complex objective function has been found to be sufficient to balance exploration and exploitation in a smooth manner. The construction of the objective function can involve balancing the following quantities:

Relevance—Relevance of a song in the seed list to the input. This can be measured by the sum of the dot products of a song vector to the vector representing the inputs, which can be a user, songs, and/or artists (plus a constant to ensure relevance is always non-zero).

Diversity—Diversity of songs in the seed list. This can be represented by the absolute difference between unique pairs of song vectors.

Popularity—Popularity of songs in the seed list.

First, a large candidate pool of songs can be selected for the user to create a seed list. Typically, these candidates can be selected only the basis of relevance. Songs can then be picked from the candidate pool serially to produce a greatest increase in score in the seed list. This can be referred to as a "greedy approach" because only the effect of the next song in the list can be computed, rather than the score for all the songs together. The score can be defined as follows:

$$S=\log(R)+\alpha \log(D)+\beta \log(P)$$

where R can be the relevance, D can be the diversity, and P can be the popularity. $\alpha$ can control the relative weighting for the diversity metric and $\beta$ for the popularity. These parameters can be selected via cross-validation, real-time A/B tests, and can be a function of number of listens for a user (there is more information for higher listen users). This operation can continue until the desired number of recommended seeds has been reached.

Although this system in some ways can transcend a need for constructing discrete seed types, discrete seeds are, nevertheless, described below.

Seed Generation With Conditional GANs

Rather than using a complex objective function, a generative approach to seed production is described.

Consumers can have naturally varying individual tastes. A listener, for example, may like Hip-Hop and Electronic, and Kanye West, but not Jay-Z. Seeds, or initial songs, that start a listening session can accommodate this variation in tastes. For example, if a user listens to indietronica ten times as often as rap, but still listens to a lot of rap, both types of songs can be recommended as seeds.

Supervised learning can attempt to learn a unique mapping from user to seed type. In a generative model there may be no singular correct output. Systems described herein can avoid overfitting to one predominant example and, in turn, underfitting other modes that fulfill the user's tastes.

Generative adversarial networks can pit two neural networks against each other. One network, the generator, can directly produce sample data via x=G(z, $\theta_g$). Another network, the adversary of the generator, can output a probability that a given sample is real or generated. This value can be given by D(x, $\theta_d$). The generator's objective can be to produce output that can fool the discriminator. For at least this reason, the generator can sample the full phase space and avoid sticking to one mode. This approach can force the generator to match across features for the users and not just over-fit to their top preference.

Here x can represent sample seed vectors, z can be input representing the noise. The $\theta_g$ and $\theta_d$ can be hyper-parameters (e.g., governing regularization) that can be used to train, respectively, the generator and discriminator.

Figure 9:
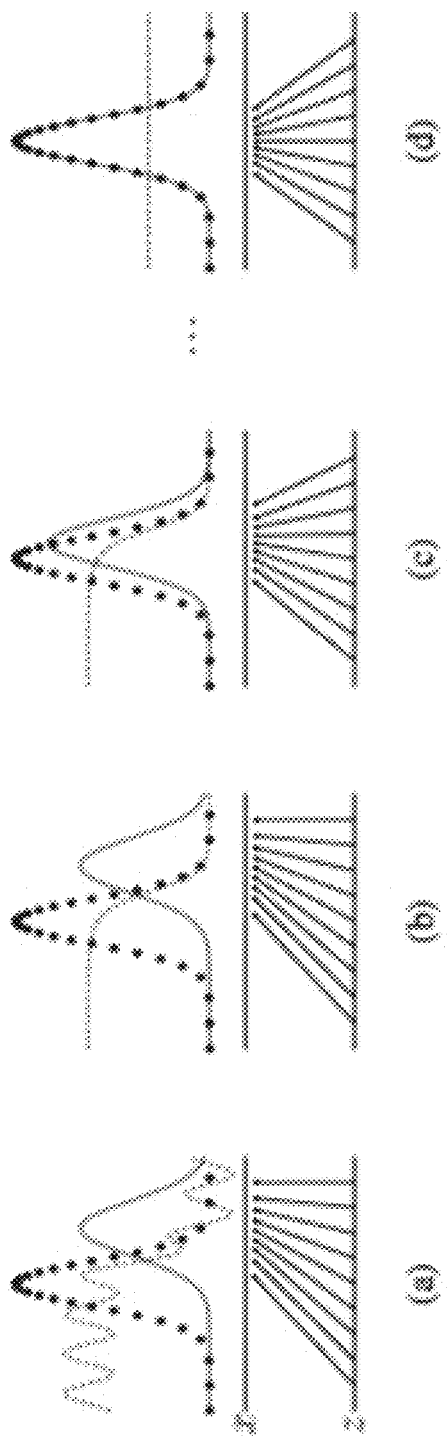
FIG. 9 includes four views of graphs that illustrate a process of training a GAN.

FIG. 9 includes four views of graphs that illustrate a process of training a GAN. In FIG. 9, the closely-spaced dotted curve can represent the output of the discriminator D—the probability of a true sample (as opposed to a generated one). The solid curve can represents a generated function, produced by x=G(z). The widely-spaced dotted curve can represent the true function. FIG. 9 also includes a vector density mapping z (the uniformly distributed noise) to the target generated (x). The general strategy in training GANs can be to improve the discriminator to (near) capacity whilst training the generator in a slower fashion. The views (a) through (d) reflect, from left to right, the progression of the GAN to near perfect generation. At completion, the discriminator can be a uniform function with value one-half, which can reflect the generator distribution matching the actual sample distribution.

The GAN can then be extended to be conditional on the user (tastes, listening history, etc.). The payoff, V(D,G), can optimize:

$$\text{Min}_G \text{Max}_D V(D,G) = E_{x,y \sim p(x,y)_{data}}[\log(D(x,y))] + E_{y \sim p_y, z \sim p_z(z)}[\log(1-D(G(z,y),y))]$$

Here D can be the discriminator, G can be the generator, and $E_{x \sim p(x)}$ can be the expectation value according to the probability distribution p(x). Note that D and G can be updated to include y as an input. y can include matrices that represent an individual users' listens (both seed and non-seed) and can determine how the GAN can be conditioned on the user. $p_{data}(x)$ can be the probability distribution from which we can draw sample x seed vectors. z can be a generated noise vector drawn from the noise distribution probability $p_z(z)$. Note V(D,G) can be optimal when D is close to one-half for both generated and real inputs (reflecting the authenticity of the generator). Thus, V(D,G)=−2 log(1/2)=log(4).

Finally, once the conditional GAN is trained, a random noise vector z and, of course, the input y, that represents conditioning on the user, can be drawn to sample.

Figure 10:
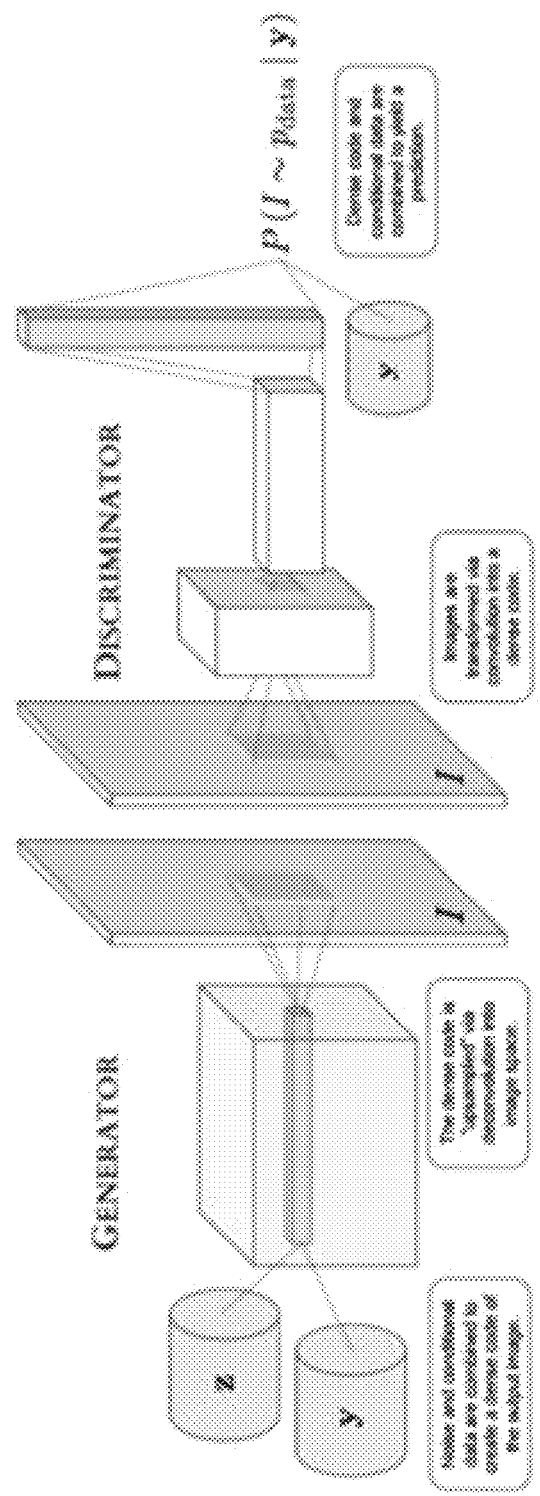
FIG. 10 is a diagram that illustrates an overview of conditional GAN.

FIG. 10 is a diagram that illustrates an overview of conditional GAN. Note that, in FIG. 10, convolution may not be included because the GAN is not used to process an image.

Discrete Seed Varieties

Most seeds can be generated by a Seed Generator system as described above. Such a Seed Generator system can employ an objective function that can balance the complex needs of generating starting songs for a listener.

According to aspects disclosed herein, a variety of discrete seed types have been constructed to balance the score based Seed Generator described above. These discrete seeds can be especially useful for hardcoded or rule-based implementations.

Some of these discrete seed types can include consumption-generated category seeds, trending and emerging seeds, popular seeds, and recent listens and likes seeds.

Figure 11:
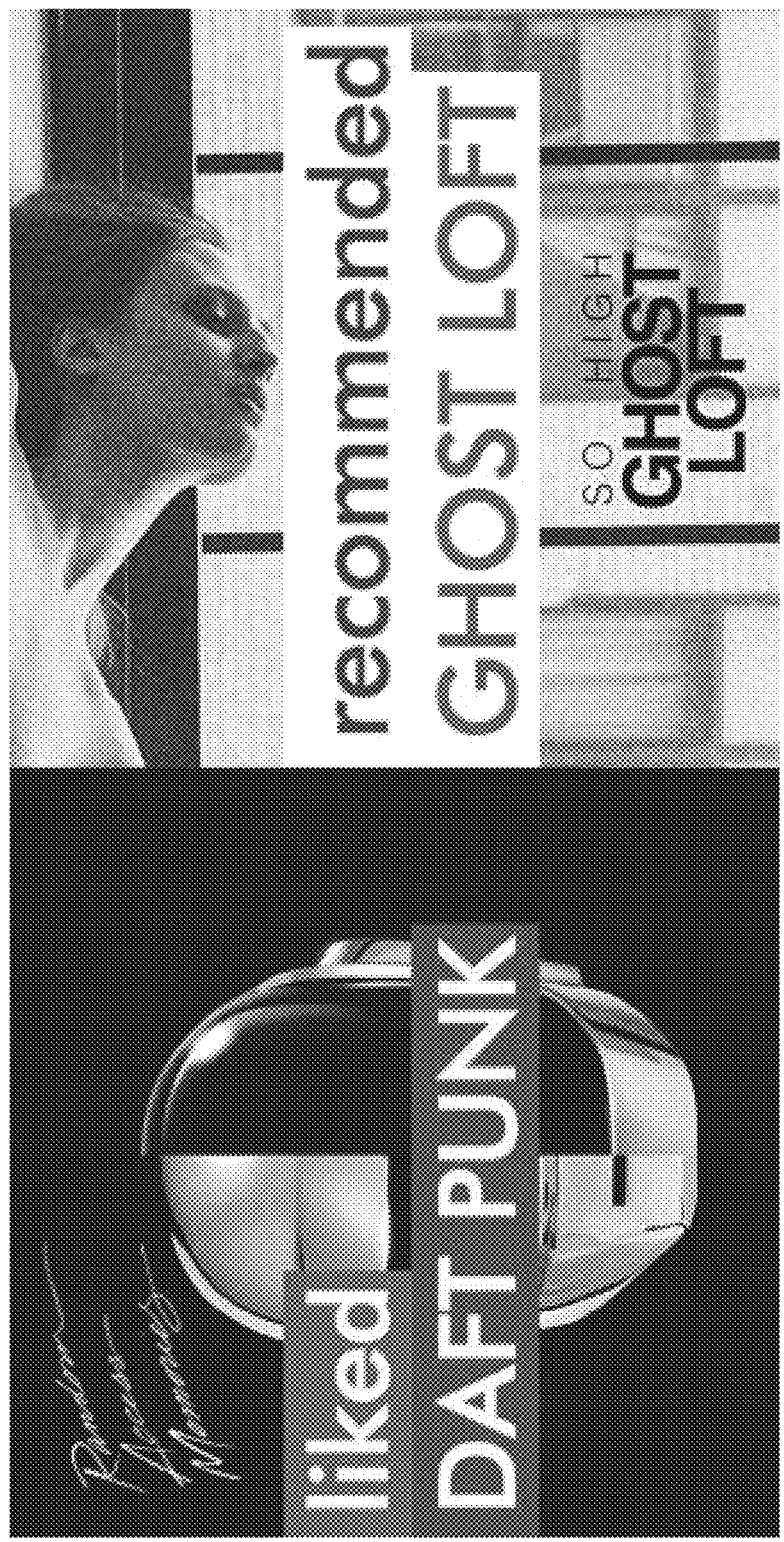
FIG. 11 is another diagram that illustrates examples of seeds.

FIG. 11 is another diagram that illustrates examples of seeds. A view (a) of FIG. 11 illustrates a seed for a Facebook-liked artist. A view (b) of FIG. 11 illustrates a seed recommended by a system as disclosed herein.

Figure 12:
FIG. 12 is yet another diagram that illustrates examples of seeds.

FIG. 12 is yet another diagram that illustrates examples of seeds. A view (a) of FIG. 12 illustrates a seed recommended by a system as disclosed herein. A view (b) of FIG. 12 illustrates a seed for a song that is currently playing by another user of a system as disclosed herein.

Figure 13:
FIG. 13 is still another diagram that illustrates examples of a seed.

FIG. 13 is still another diagram that illustrates examples of a seed. FIG. 13 illustrates a seed generated as a popular seed by a system as disclosed herein.

Category Seed Creation

Conventionally labeled genres may fail to capture how people actually listen to music. For example, people often play popular hip-hop alongside popular electronic music. Many of the popular artists today, for example Kanye West, may transcend several of the traditional genres.

Instead of using prescribed labels and boundaries, categories/clusters can be generated through actual user consumption. In this manner, consumption-generated categories can be constructed and regularly reconstructed.

The listening activity can be examined at the artist level. An artist can be represented by a distinct vector. The closer the vector representation of an artist is to another, the more similar these artists can be said to be. Vector construction is described above.

As described in more detail below, listens can be power-law distributed with a small percentage of artists dominating the majority of listens. Thus, a collection of top artists (by total listens) can be aggregated by artist-space vectors. A two-dimensional reduction on these artist-vectors can be performed using, for example, a technique called t-distributed Stochastic Neighbor Embedding (t-SNE), which can be particularly effective to generate well separated clusters.

With a two-dimensional vector for an artist, a cluster can be produced using, for example, Dirichlet process mixture models. Dirichlet process mixture models can include a nonparametric process that can require no predetermined number of clusters, but instead cam determines the optimal number automatically.

Once the clusters have been produced, the cluster centers can be fed into Gaussian Mixture Models to produce:

1. Discrete categories for an artist, based solely on consumption.
2. A probability of an artist belonging to a category, including those that may not be the strongest match.

This process can allow for partial membership and consumption driven categories that may not depend on rigid genres. This can be because the Gaussian Mixture Models can assume that artist vectors have been generated from a mixture of Gaussians with various means and variances. The closer an artist vector is to the mean of a particular category's Gaussian, the better a match can be for that category. Likewise, the artist vector can suffer a larger penalty for being further from the mean, the smaller the variance of that particular Gaussian can be. The probability for a particular artist belonging to a particular cluster i, can be:

$$weight_i = \exp\left(-\frac{(\vec{x} - \vec{\mu_i})^2}{2\sigma_i^2}\right)$$

where $\vec{x}$ can be the location of the tSNE projected artist vector in question, $\vec{\mu_i}$ can be the center or mean vector of cluster i, and σ can be the standard deviation of cluster i.

For a category, artists can be stored by their match to the category, including artists on the periphery. A random number weighted proportional to the weight of the artist in that category can be used to draw appropriate assignment.

Lastly, a category that includes artists outside of the top artists list can be added. This final category, the 'not popular' category, can be useful. Less popular artists can be used as suggestions for users desiring less-popular options.

Figure 14:
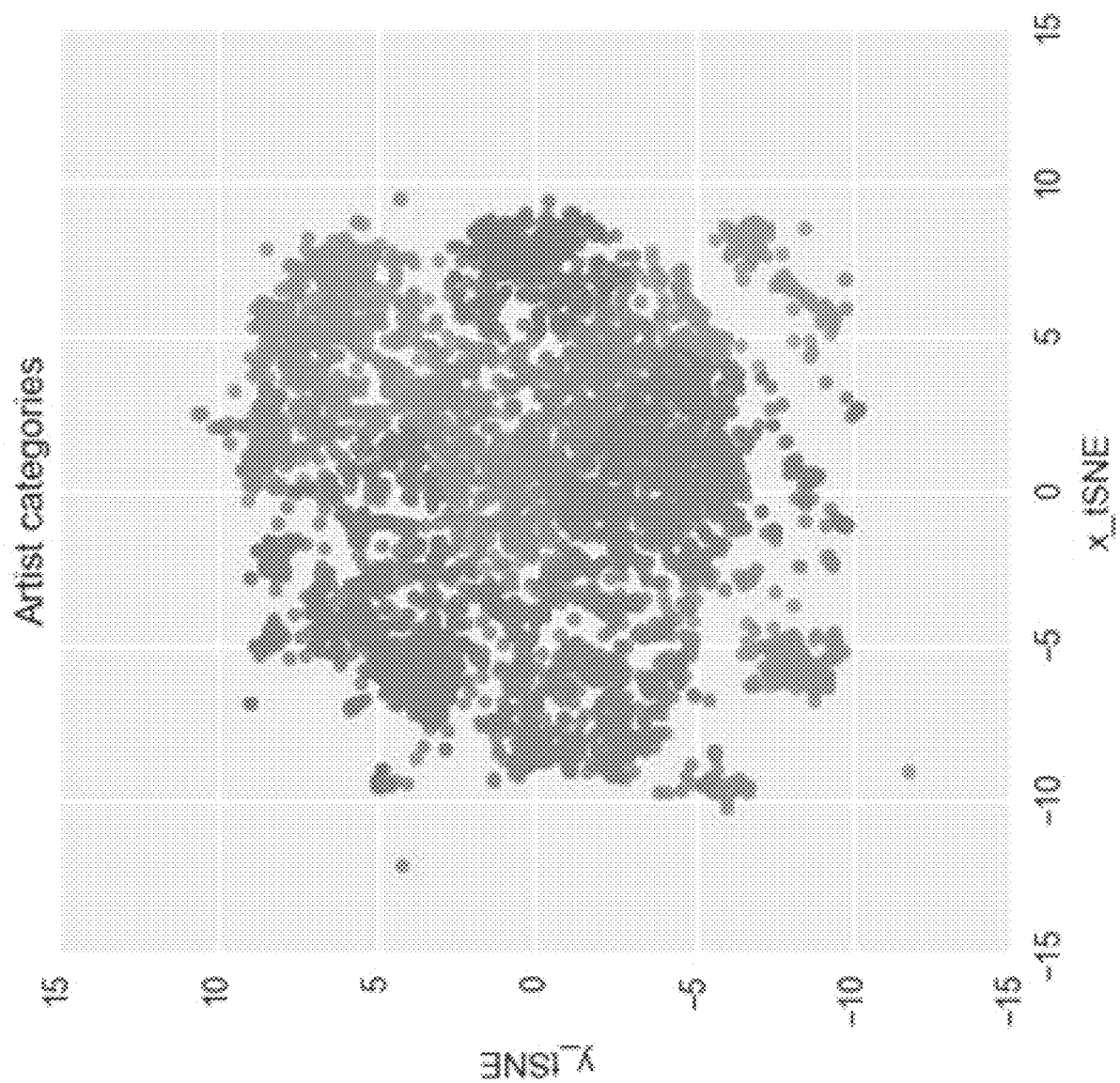
FIG. 14 illustrates a graph of Gaussian mixture generated clusters on top artists' vectors.

FIG. 14 illustrates a graph of Gaussian mixture generated clusters on top artists' vectors. This can be an example of categorization according to aspects disclosed herein.

Figure 15:
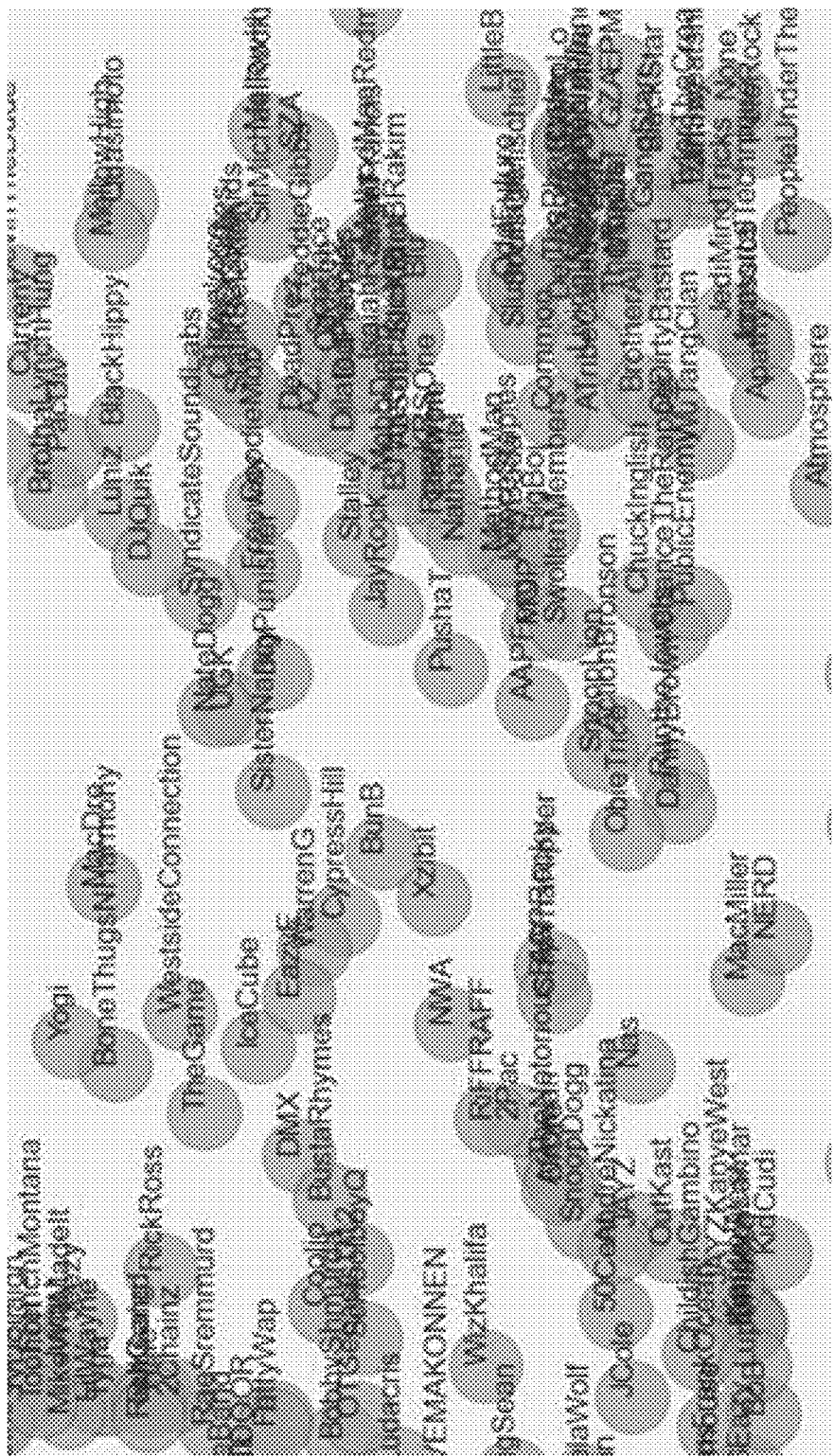
FIGS. 15 and 16 illustrate examples of zooms on sample clusters.
Figure 16:
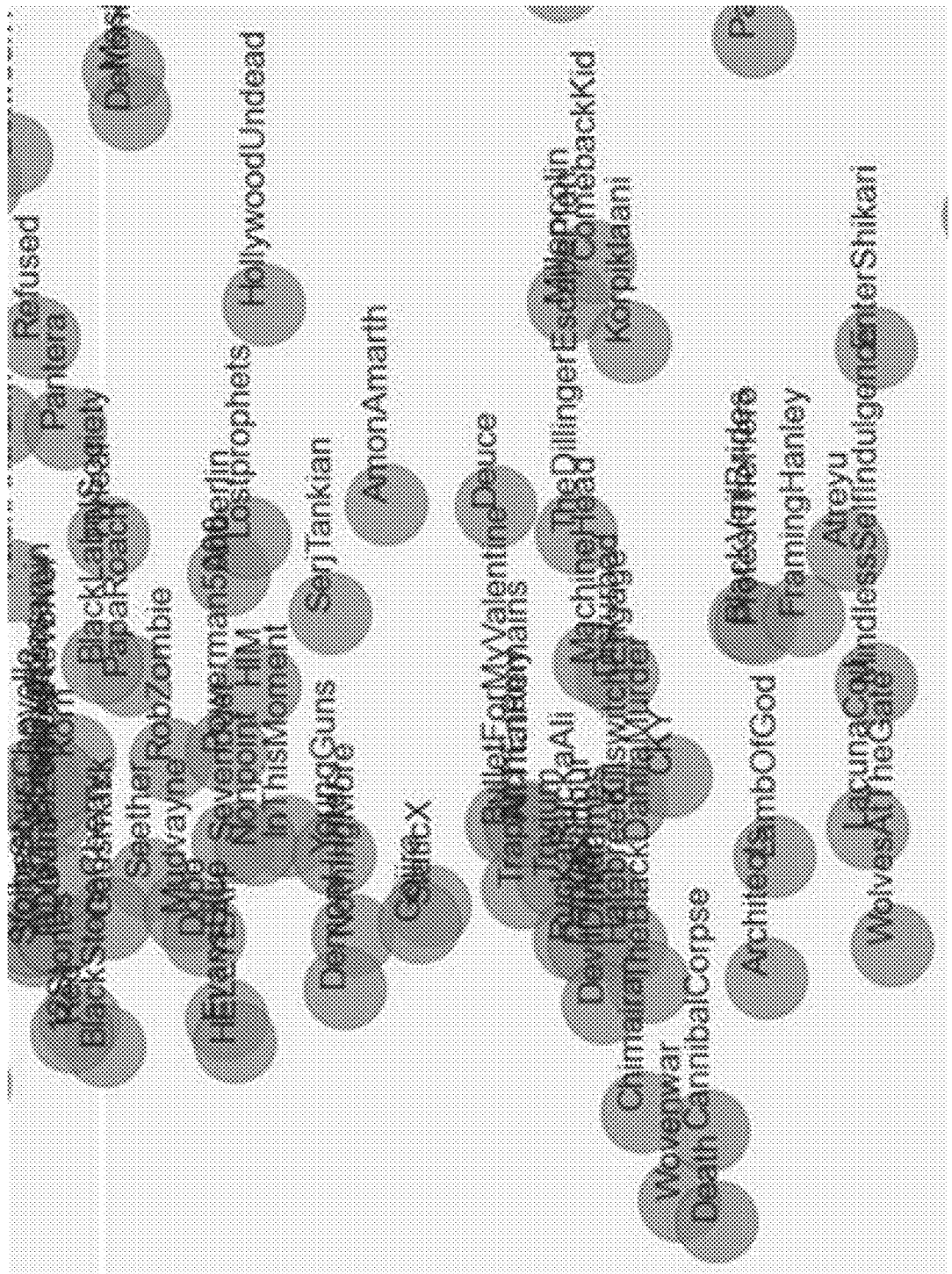

FIGS. 15 and 16 illustrate examples of zooms on sample clusters. Again, these can be examples of categorization according to aspects disclosed herein.

The weight of a category for a user can be stored in a N-d array ($w_1, w_2, \ldots, w_N$) that represents the sampling of categories by the user, including the "not top" category.

Category preferences of a user can be stored in a Dirichlet distribution. The Dirichlet distribution can be the conjugate prior of the multinomial distribution. The weights can be initialized with the weights generated for other users and an overall number with the typical standard deviation for a user. This can function as a Bayesian prior. As the user listens to more music, the weighting of the Dirichlet distribution can be continually updated to reflect the preference of the user and thus can provide seamless category personalization for the user. This technique can also be used for time preferences as described below.

Figure 17:
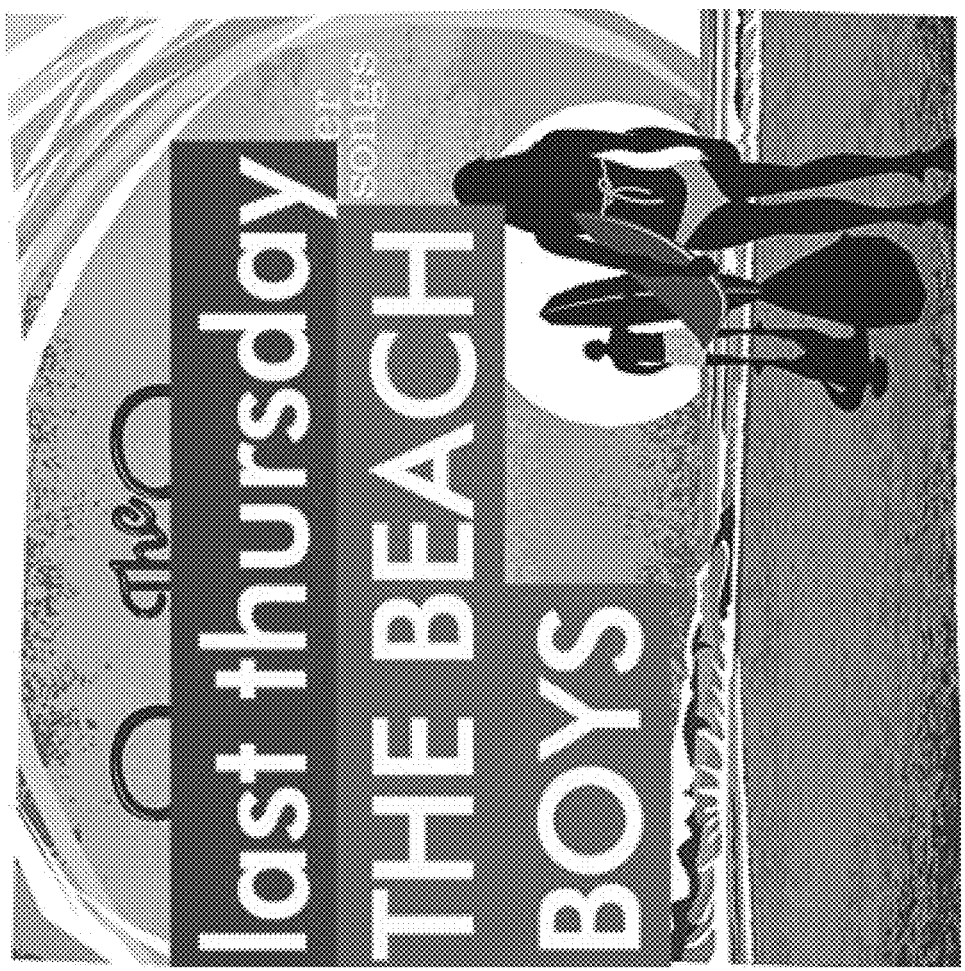
FIG. 17 is another diagram that illustrates examples of a seed.

FIG. 17 is another diagram that illustrates examples of a seed. FIG. 17 illustrates a recent listen seed generated by a system as disclosed herein.

Seed Types

One approach to drive engagement can be by making recommendations feel alive and relevant. This can be done by displaying trending and emerging content as well as recent listens and likes.

Trending artists/songs can be the top performing artists in a recent time interval.

Emerging artists/songs can be relatively less well known artists with high listen count songs.

Recent Listens can be based on recent external listen activity and can offer the user a sense of familiarity.

Artist Likes can be based, for example, on Facebook likes.

Song Likes can be, for example, from tracks explicitly liked on a system as disclosed herein.

Staff Picks can be curated, for example, by industry advisors, including staff associated with systems disclosed herein.

Active seeds can be songs that similar or songs that socially connected users are listening to at that moment.

Campaign seeds can be manually generated to deliver custom playlists for special promotions.

Recommended seeds can be prepared by the Taste Profiler for an individual.

Static Playlisting

Static playlists can be generated with inputs that include one or more user taste profiles, songs, and/or artists. Playlist construction can involve balancing of the objectives defined for seed generation, but can also include smoothness—which can be represented by the dot product of a song with one or more adjacent songs' vectors (plus a constant to ensure non-negativity).

Songs can be selected by generating a large pool and then picking individual songs to optimize the score in a "greedy" manner. The score can be:

$$S = \log(R) + \alpha \log(D) + \beta \log(P) + \gamma \log(S)$$

where R can be the relevance, D can be the diversity, P can be the popularity, and S can be the smoothness. α can control the relative weighting for the diversity metric, β for the popularity, and γ for smoothness. This operation can be continued until the desired number of songs in a playlist is reached.

Filtering by Number of Listeners

Figure 18:
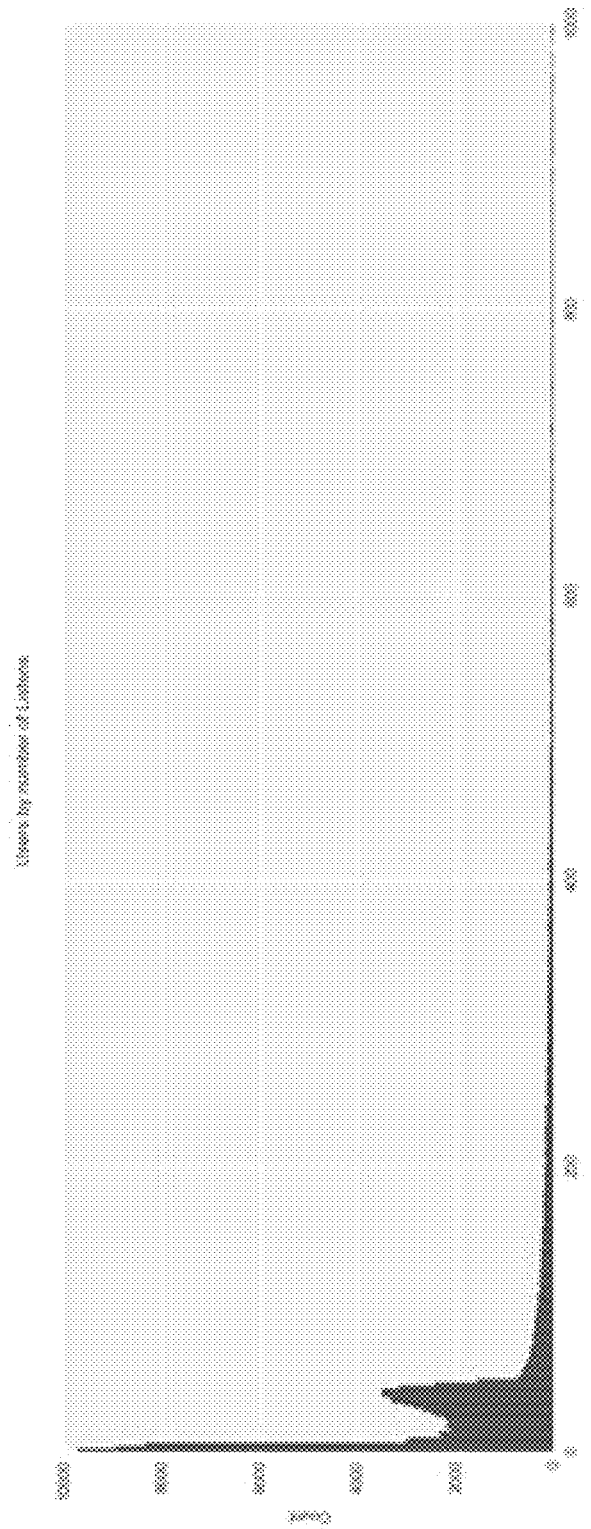
FIG. 18 is an example of a histogram of total listens per user.
Figure 19:
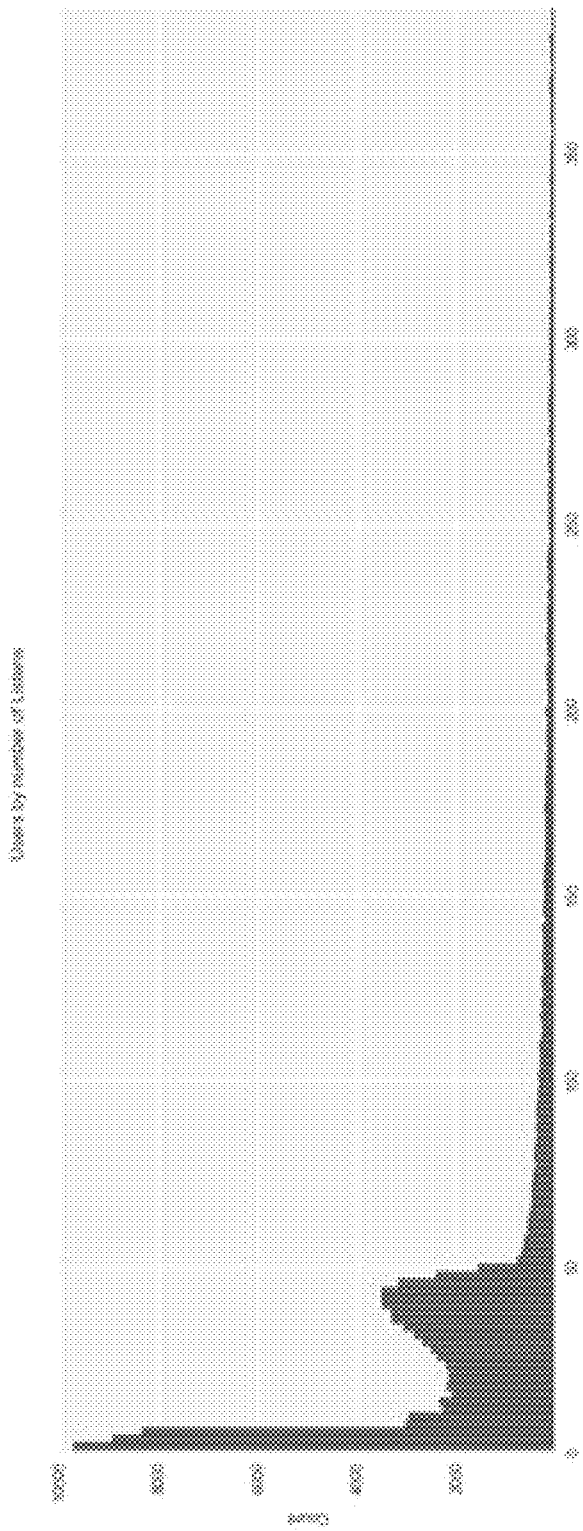
FIG. 19 is an example of a zoomed in histogram of total listens per user.

The majority of users may have relatively few listens. FIG. 18 is an example of a histogram of total listens per user; FIG. 19 is an example of a zoomed in histogram of total listens per user. As illustrated in the histograms, listens can be power law distributed with a hump located at a point indicative of a critical number of songs. Users past this point may fit the typical power law distribution. Systems disclosed herein can address the situations of low listen count users and high listen count users differently.

New Users

Special care can be taken to ensure users with few listens are engaged with more familiar options. These users can benefit from the dynamically updated user vectors, but may not yet be rolled into the full CF system. Instead, an online taste profile for these users can be produced as described above. Additionally, the seed options can be further focused using demographic based filtering, as described herein, as well as generally filtering for more popular options.

Power Users

Power users can be characterized has having a greater number of listens. In addition to the greater number of listens, which, in turn, can provide higher quality recommendations, power users can be provided with balanced mixtures of popular and less popular songs that may not be deployed to first time users, who may expect more familiarity. This is described in greater detail below.

Temporal and Demographic Personalization

Music preferences can be affected by the time of day. The demographic profile of a user can also give insight into some specific kinds of recommendations to make. For at least this reason, statistically significant preferences for categories by time and demographics can be identified. A classifier can be used to determine statistically favorable categories for users based on time of day and their demographic.

Temporal Personalization

For individuals with enough listens, time preferences can be personalized to their specific listening patterns. A Bayesian updating approach can be used to determine category weights as described above.

Demographic Based Filtering

When available, gender, age, and location can be included into the Random Forest Classifier for artists in order to specifically target key songs and category weights that users may enjoy based solely on demography. This can also assist in generating initial seeds for an audience.

Data

A primary data set can come in the form of listening activity collected from a system as disclosed herein along with external consumption activity linked, for example, to user Facebook accounts. This can include many millions of listens, for example, across Spotify, Deezer, Pandora, and various other music services. Listening data can also be received directly from strategic partners such as, for example, Universal Music Group and VEVO.

Listening data can be partitioned into events. An event can be defined by (u, i, t) where u can be a specific user, i can be a specific item (e.g., song or artist depending on the situation), and t can be the time-stamp for that event.

Another form of data can include "artist likes" and "listen likes." An "artist like" can be a like of an artist, for example, on Facebook. This can be used in the Taste Profiler. A "listen like" of a song that is played on a system as disclosed herein can be used in the Context Profiler.

Select public signals, including music charts and social activity, can regularly be collected and can influence recommendations.

Complementary and private third party data can be fed directly into a system as disclosed herein via an Application Programming Interface (API).

Taste Profiler

In a Taste Profiler, the data can be organized as a bag-of-words model that can ignore the time component. The data can be projected into a listening matrix M of users (rows) vs. songs (columns). An element of the listening matrix $M_{u,i}$ that corresponds to row u (for user u) and column i (for item i) can be equal to the number of unique listens plus a multiple of the number of likes (a "like" can be counted as a multiple listen). The matrix can contain 0 if there is no listen.

Users typically listen to a very small subset of possible songs. For at least this reason, the listen matrix $M_{u,i}$ can be very sparse. A model that can be trained to this data is described above. Models can be trained separately for users vs. songs and for users vs. artists.

Context Profiler

In a Context Profiler, the data can first be sorted by user. For a user, the data can be further grouped into sessions. A session can be defined by the requirement that a certain number of songs are played subsequently and not paused very long between plays. A long pause can define a definite end of a session and a potential start of another grouping. A session can be used as input to train a dynamic recommender as described above including, for example, how in-session "likes" can be incorporated into a pooling strategy.

Data Ingestion Process

The ingestion process can be an elaborate distributed, scalable, and idempotent process for getting content into our system, broken down into three steps:

1. Download: Distributed workers can download external listening events from many sources, reaching across social networks in order to obtain as much data as possible. Such distributed workers can be responsible for handling a potential exception case such as, for example, a network outage, an external downtime, or a rate limiting. Ingested listen activity can be pushed onto an outgoing queue for processing by the next group of workers.

2. Sanitize: Sanitization workers can process the downloaded listen activity and work to identify the content, first by attempting to match the content against existing content in a system as disclosed herein and, on failure, scheduling resources for further lookups. Once the content is sanitized, the content can be pushed along onto the next queue.

3. Denormalize: Finally, workers can idempotently increment a variety of counters based on the user and the content. This can allow for efficient lookups at a later time.

Data Partner Mappings

Systems disclosed herein can host internal identifiers for songs, artists, and relationships. Systems disclosed herein can also maintain a constantly evolving store of maps between songs associated with the system and external identifiers of the songs for a variety of third party services. These external mappings can include, for example, MediaNet, Spotify, Deezer, VEVO, and others. This can allow the data ingestion process to remain provider agnostic and to recommend content across services.

Interstitials

In order to paint more "color" into the experience of using systems disclosed herein, interstitial messages, or interstitials, which are short contextual messages that play between some songs, can be offered. Three interstitial options can be included for a song: one option can be to display in the event that the song is skipped, one option can be to display in the event that the song is liked, and one option can be to display in the event that neither of those events occurred, such as when a user plays through an entire song with no explicit interaction.

Feeding many of the interstitials can be a denormalized datastore that maintains an ongoing reference to the "popularity" of songs and users on an absolute/overall scale, a relative/per-user scale, or both. This can allow for efficient lookups system-wide, among specific social graphs, or both.

These interstitials can be powered by an Interstitials API, which can be leveraged to serve contextual ads and ticket and merchandise sales.

There can be a variety of active interstitial types including, for example:

Leaderboard Leader: a message that can indicate who the overall current "most popular" user is (e.g., "Damian M is dominating with 702 likes")

Leaderboard User: a message that can indicate where the logged-in user sits on the overall popularity leaderboard (e.g., "You are fifth most popular with 230 likes")

Leaderboard Friend: if listening to a song that a friend of the user listened to, a message that can indicate where that friend sits on the overall popularity leaderboard: (e.g., "Hery R is sixth most popular with 214 likes")

Associative: a message that can indicate to the user which other friends liked the current song, which can be useful for displaying when the user explicitly likes a song: (e.g., "Eva B and 2 other friends liked your song")

Associative Artist: a message that can indicate to the user which other friends liked or skipped the current song's artist: (e.g., "14 of your friends skipped Jay-Z")

Contrarian: a message that can indicate to the user which friends performed the opposite action from the user (i.e., if the user liked the song, which friends skipped the song and vice versa: (e.g., "Damian M actually liked that song"))

Friend Usage: a message that can indicate how often friends of the user have used a system disclosed herein in the last week: (e.g., "Sam S has popped up 2 times this week")

Friend Engagement: a message that can indicate how often the user has listened to songs that a friend has also listened to: (e.g., "Hery R has popped up 27 times this week")

Artist Leaderboard: a message that can indicate where the current song's artist ranks out of all artists played within the current user's social circle: (e.g., "Jay-Z is number six among your friends")

Song Leaderboard: a message that can indicate where the current song ranks out of all songs played within the current user's social circle: (e.g., "That song is the 12th most popular among your friends")

Release Date: a message based on the release date of the current song; for example, if the song came out a long time ago, the message can state something like "throwback," and if the song is newer, the message can state something like "fresh"

Genre: a message based on the genre in which an identification of the genre can be provided from one of various ingestion resources; for example, if the song is a Rock song, the message can state something like "rockin"

Artist-specific: manually-programmed interstitials based on specific artists; for example, after an Austin Mahone song, the message can state "we won't tell the Biebs"

Event-specific: time-frame based interstitials based on programmed events; for example, if Giorgio Moroder is playing on Jimmy Fallon on a given night, a system disclosed herein can have the ability to highlight that event and the message can state something like "don't miss Giorgio Moroder tonight on Fallon!" This interstitial, in particular, can be particularly useful from an artist marketing standpoint Canned: fallback phrases such as, for example, "bazinga" or "dude," which can be used, for example, in the event that none of the other interstitials apply to still add a some personality and spice to an experience Music Metrics and Evaluation Recommending music can be a subtle and difficult process. Systematic testing and evaluation can be critical to understanding how a recommendation engine is performing. Described below are some sample metrics that can be used to evaluate the predictive personalization technology so as to ensure that listeners can be served appropriate content.

The Taste Profiler, the Context Profiler, and the Ensembler can be tested. The data can be partitioned into training and validation sets in order to cross-validate.

A metric can be used to measure user preference for popular music vs. less popular music.

Taste Profiler Testing

For a static system, the set of listens, defined by instances of users u listening to items i, (u,i) in the listen matrix $M_{u,i}$, can be divided into a training set, which typically can include 90 percent of all events, and a test set. The can be delineated, respectively, as $M^{tr}$ and $M^{te}$.

For an event (u, i) in the test matrix $M^{te}$, a check can be made to determine if the user u is also in the training set $M^{tr}$. (This can be the usual case because 90 percent of the selected events are in the training set.) Having confirmed the user exists in the training set, the recommendation system can be run to produce a list of items, for that user u, ranked from most recommended to least recommended. Two metrics, Mean Percentile Ranking and Top-100 Percentage, are described below. The Mean Percentile Ranking metric can be more precise because it tests the gross or global performance of our system. The Top-100 Percentage metric can be more true to how recommendations are actually served because any songs/artists served can typically be from the top 100 items for that user. Each metric can complement the other.

Mean Percentile Ranking

A function $rank_{u,i}$ can be defined to indicate the rank of item i for user u. The Mean Percentile Ranking of events of the test set:

$$MPR = \frac{100 \left( \sum_{u,i} M^{te}_{(u,i)} rank_{u,i} \right)}{\left( \sum_{u,i} M^{te}_{(u,i)} \right)}$$

Figure 20:
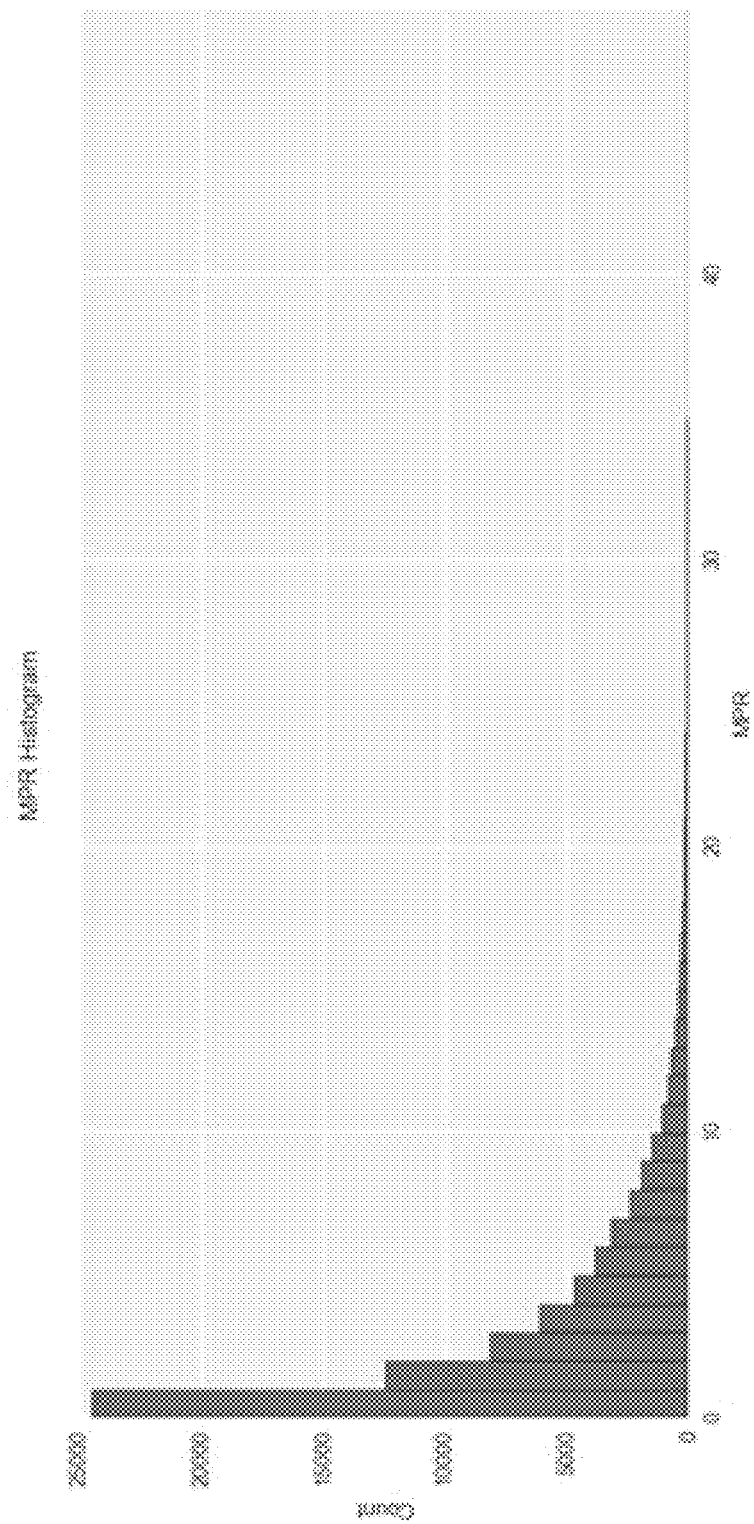
FIG. 20 is an example of a user MPR histogram.

Note, by this construction, this quantity can be between 0 and 100, with 0 being a perfect score. Furthermore, this quantity can be 50 for a random recommendation algorithm. For reference, popular songs can typically have a score around the $15^{th}$ percentile. Systems described herein can perform at the $6^{th}$ percentile. FIG. 20 is an example of a user MPR histogram.

Figure 21:
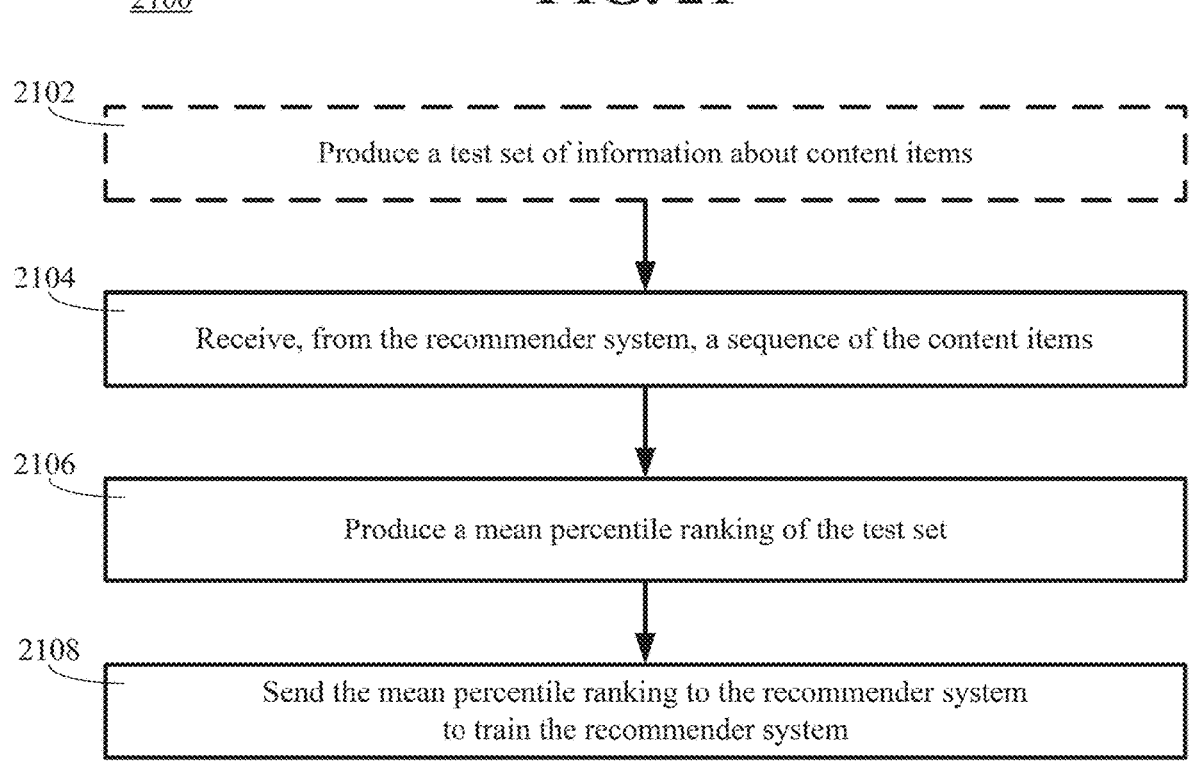
FIG. 21 is a flow diagram illustrating an example of a method for evaluating a performance of a recommender system.

FIG. 21 is a flow diagram illustrating an example of a method 2100 for evaluating a performance of a recommender system. In the method 2100, at an operation 2102, optionally, a test set can be produced by a processor. The test set can be of information about content items. The content items can be, for example, songs. The information about the content items can be organized in a matrix. A first dimension of the matrix can correspond to users. A second dimension of the matrix can correspond to the content items. An element of the matrix can have a number that equals a sum of: (1) instances of consumption of a corresponding content item by a corresponding user added to (2) a count of indications of appreciation for the corresponding content item. The test set can be produced, for example, by: (1) dividing a population of the information about the content items into a training set and a prospective test set and (2) verifying, for the element of the matrix of the prospective test set, that the corresponding user is included in the training set.

At an operation 2104, a sequence of the content items can be received by the processor from the recommender system. The sequence of the content items can be produced, for a user, from the test set of the information about the content items. An order of the sequence can be from a most recommended content item to a least recommended content item. The most recommended content item can have a rank of one. Another recommended content item of the sequence can have a rank equal to one added to a rank of a recommended content item that immediately precedes the other recommended content item.

At an operation 2106, a mean percentile ranking of the test set can be produced by the processor. For example, the mean percentile ranking can be produced dividing a sum of ranks of recommended content items of the sequence by a sum of a number the content items in the test set.

At an operation 2018, the mean percentile ranking can be sent from the processor to the recommender system to train the recommender system.

Figure 22:
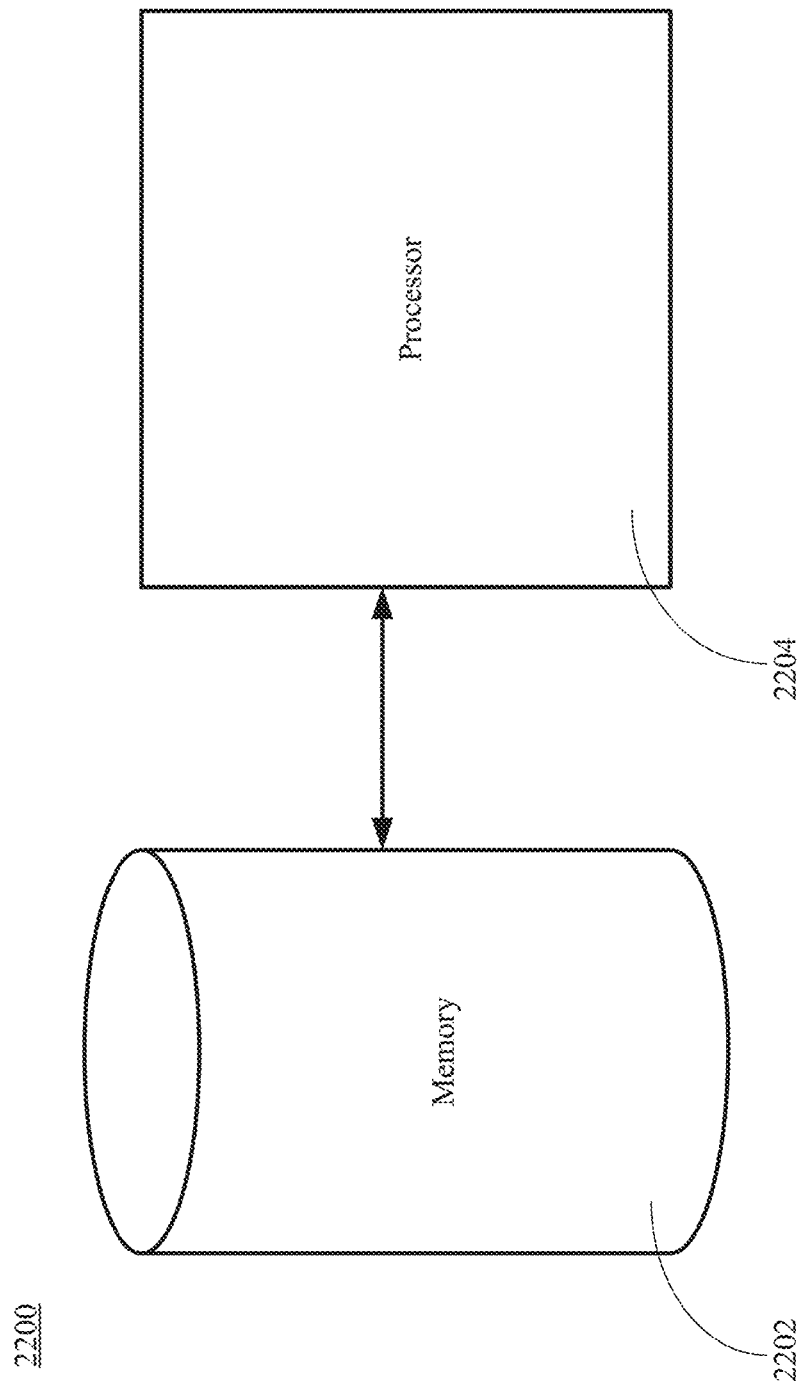
FIG. 22 is a block diagram illustrating an example of a system for evaluating a performance of a recommender system.

FIG. 22 is a block diagram illustrating an example of a system 2200 for evaluating a performance of a recommender system. The system 2200 can include a memory 2202 and a processor 2204. The memory 2202 can be configured to store a sequence of content items produced, for a user, from a test set of information about the content items. The content items can be, for example, songs. The information about the content items can be organized in a matrix. A first dimension of the matrix can correspond to users. A second dimension of the matrix can correspond to the content items. An element of the matrix can have a number that equals a sum of: (1) instances of consumption of a corresponding content item by a corresponding user added to (2) a count of indications of appreciation for the corresponding content item. An order of the sequence can be from a most recommended content item to a least recommended content item. The most recommended content item can have a rank of one. Another recommended content item of the sequence can have a rank equal to one added to a rank of a recommended content item that immediately precedes the other recommended content item.

The processor 2204 can be configured to produce a mean percentile ranking of the test set and to send the mean percentile ranking to the recommender system to train the recommender system. For example, the processor 2204 can be configured to produce the mean percentile ranking by dividing a sum of ranks of recommended content items of the sequence by a sum of a number the content items in the test set. The information about the content items can be organized in a matrix. A first dimension of the matrix can correspond to users. A second dimension of the matrix can correspond to the content items. An element of the matrix can have a number that equals a sum of: (1) instances of consumption of a corresponding content item by a corresponding user added to (2) a count of indications of appreciation for the corresponding content item. Optionally, the processor 2204 can be configured to produce the test set by: (1) dividing a population of the information about the content items into a training set and a prospective test set and (2) verifying, for the element of the matrix of the prospective test set, that the corresponding user is included in the training set.

Top-100 Percentage

In addition, the average percentage of time users in the test set listened to songs in the top 100 of their respective recommendations can be computed. This can be referred to as the Top-100 Percentage.

$$top_{100} percentage = 100\left(\frac{N_{listens}(\text{rank} \leq 100)}{N_{listens}}\right)$$

Context Profiler Testing

Disclosed herein is a novel metric to quantify the quality of recommendations that can be made based on in-session information.

The listen history of users can be divided into session windows. A session window can have a number of content items such as songs that have been rendered (e.g., played) with no more than a given amount of time between plays. For example, a session window can be defined as a block of 3-5 songs played with no more than a 30 second pause between songs. The number of songs in a session window can be denoted as M.

For example, for a session window, all of the songs, except the second to last song played (the M-1$^{th}$ song), can be used to construct a list of songs from most likely to be listened to next to least likely to be listened next.

The list of songs can be constructed by ranking songs by how well they match to a vector that is the sum of the vector representation of the first M-2 songs according to the Context-Based Filtering system. A ranking can be a predicted likelihood that the Mth song will be the ranked song. For example, the ranking can be an integer such as 1 for the song predicted to be the most likely to be listened to next by the user, 2, for the song predicted to be the second most likely to be listened to, and so on. For a song-base with N songs, a rank of N can be assigned to the song predicted to be least likely to be listened to next, based on the first M-1 songs in the window.

Having ranked the songs in a data set, the particular rank of song M-1 (the second to last song listened to in the window), r, can be based on a prediction that can be a function of the last M-2 songs in that window.

The session metric can be r divided by N, the total number of songs in the song-base. This can yield a number between 0 and 1 that can measure performance. 0 (r is small and N is large) can be perfect, meaning the song listened to was at the very top of the rankings of songs. 0.5 can be the mean for a random algorithm. Finally, 1.0 can be worse than random, meaning the song listened to is at the bottom of the list. This indicates that the prediction made by the recommendation engine is worse than a random selection from the user-base. Thus, the session metric can be represented as:

$$r = Rank_{predicted}(song_1, \ldots, song_{M-1})$$
$$\text{Session Metric} = \frac{r}{N}$$

A good session metric can indicate that the engine is working properly and need not be adjusted. A bad session metric can indicate that the engine is not working properly and should be adjusted. The adjustment can include tuning parameters (such as weights and filtering parameters) in one or more components of the engine, and/or adding or removing various components to the engine. For example, the session metric can be used to help improve model selection for the recommendation system and to train weights that combine different recommendation systems, such as dynamic, offline, and pooling systems. This engine assessment and correction can be done in ways that allow rapid iteration because new feedback can be generated each time a user actually listens to a new song.

Figure 23:
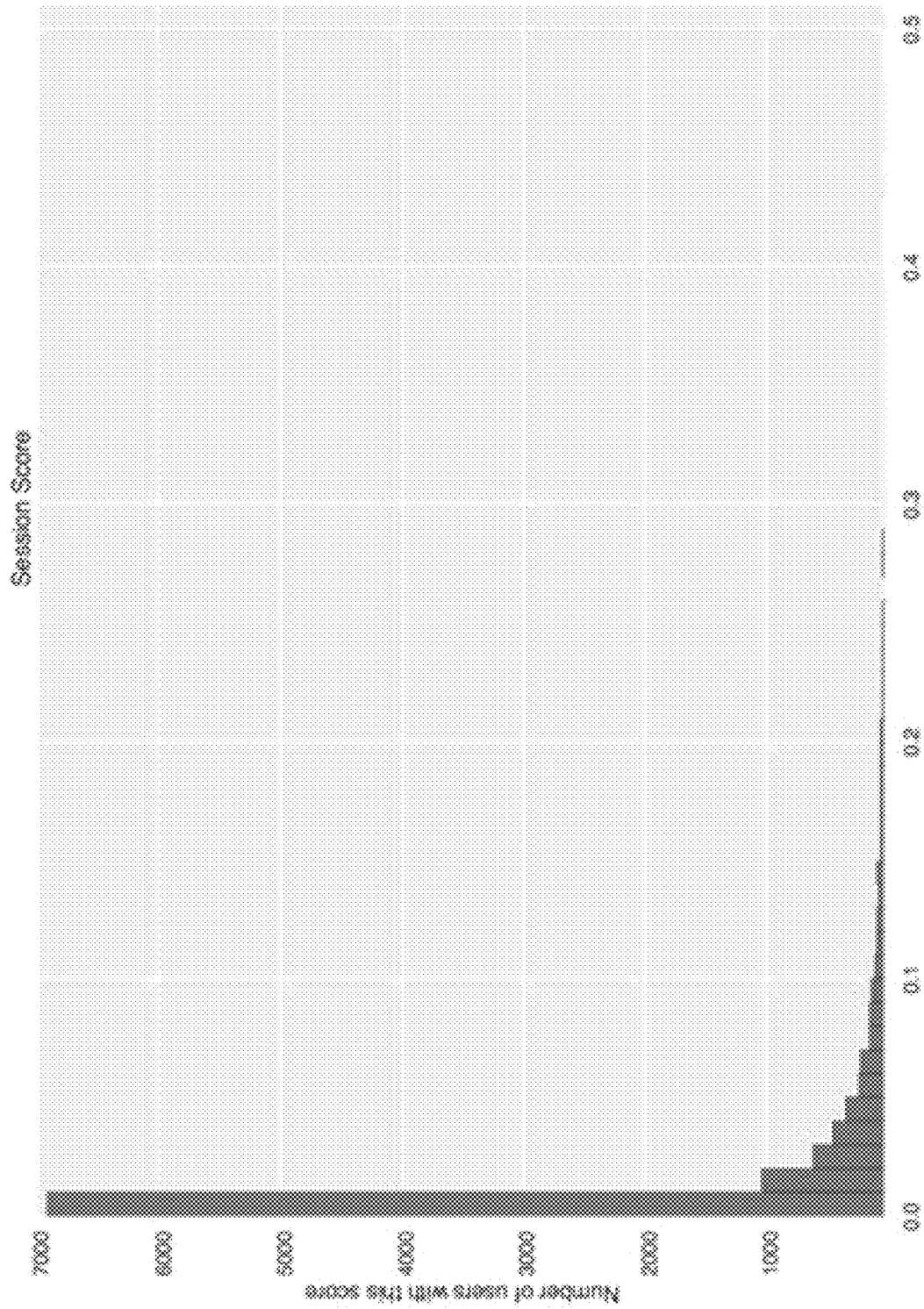
FIG. 23 is an example of a histogram of session scores.

Systems disclosed herein can score ~0.02, effectively performing at the 2$^{nd}$ percentile when equated with the Mean Percentile Ranking described above. This level of performance can be realized without any user personalization. Scores can improve when further filtered by a modified CF profile. FIG. 23 is an example of a histogram of session scores.

Figure 24:
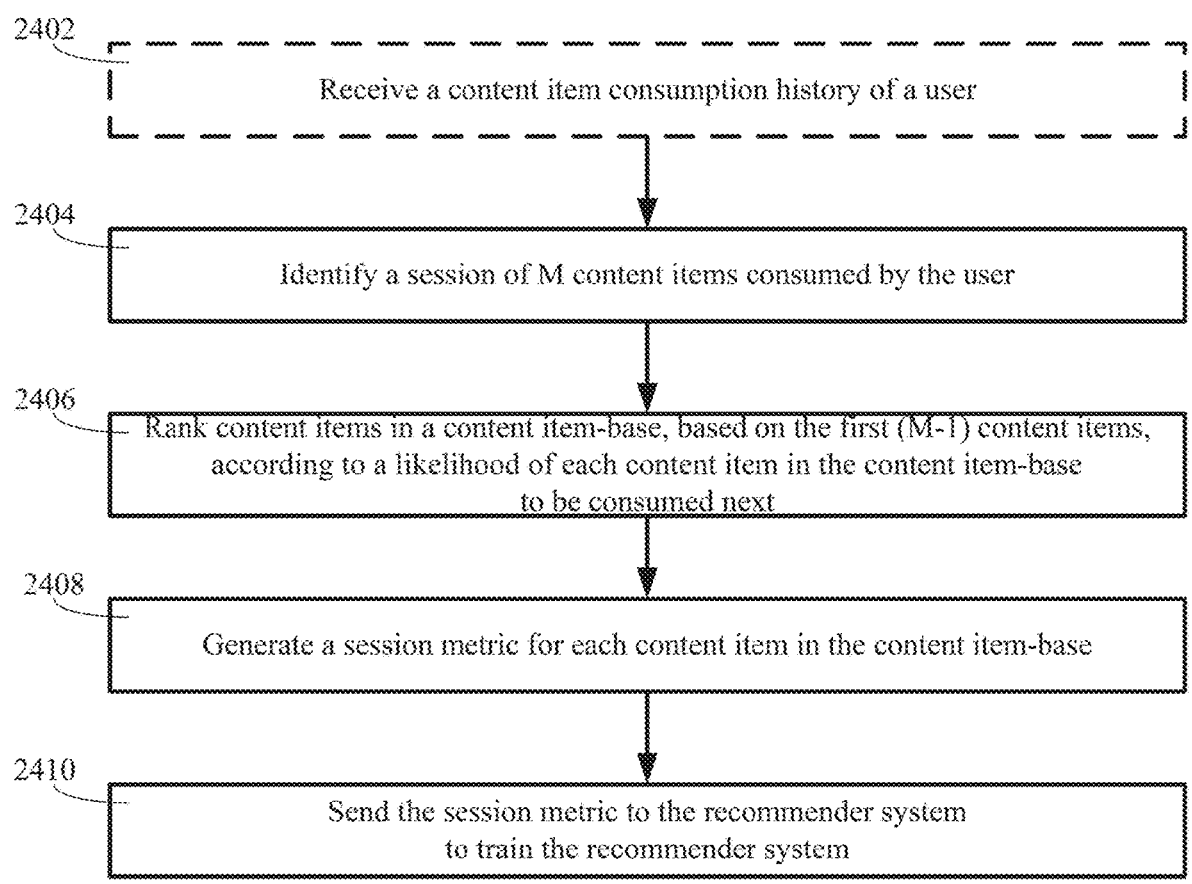
FIG. 24 is a flow diagram illustrating another example of a method for evaluating a performance of a recommender system.

FIG. 24 is a flow diagram illustrating another example of a method 2400 for evaluating a performance of a recommender system. In the method 2400, at an operation 2402, optionally, a content item consumption history of a user can be received at a processor. At an operation 2404, a session of M content items consumed by the user can be identified at the processor. The content items can be, for example, songs. The session can be defined such that, for each of a first (M-1) content items in the session, a delay time between a completion of consumption of one of the first (M-1) content items and a commencement of consumption of a directly next content item in the session is less than a predetermined duration of time. For example, the predetermined duration of time can be 30 seconds. At an operation 2406, content items in a content item-base can be ranked, at the processor, based on the first (M-1) content items. The ranking can be performed according to a likelihood of each content item in the content item-base to be consumed next. At an operation 2408, a session metric for each content item in the content item-base can be generated at the processor. The session metric can be a quotient of a rank of the content item divided by a number of content items in the content item-base. At an operation 2410, the session metric can be sent from the processor to the recommender system to train the recommender system.

Figure 25:
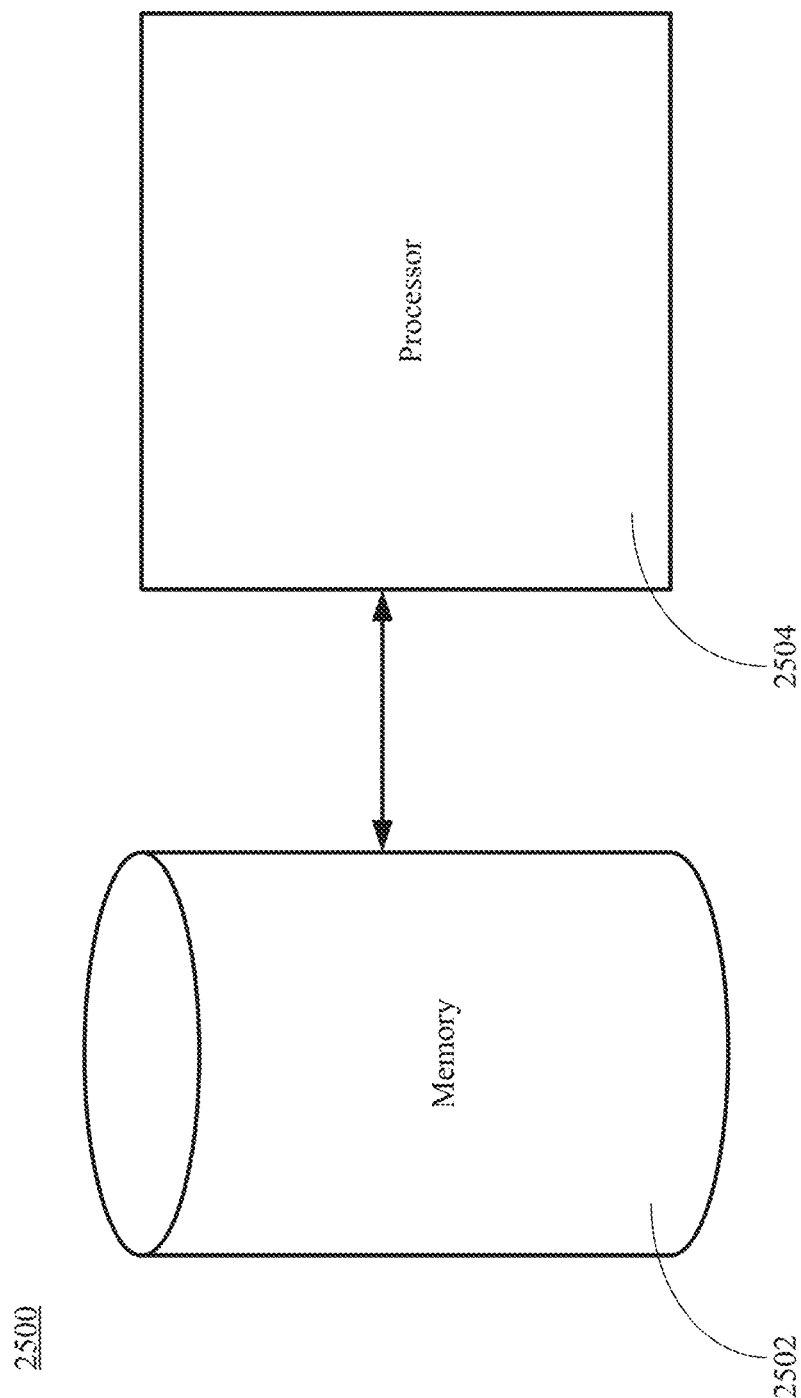
FIG. 25 is a block diagram illustrating another example of a system for evaluating a performance of a recommender system.

FIG. 25 is a block diagram illustrating another example of a system 2500 for evaluating a performance of a recommender system. The system 2500 can include a memory 2502 and a processor 2504. The memory 2502 can be configured to store a content item consumption history of a user. The processor 2504 can be configured to identify a session of M content items consumed by the user. The content items can be, for example, songs. The session can be defined such that, for each of the first (M-1) content items in the session, a delay time between a completion of consumption of one of the first (M-1) content items and a commencement of consumption of a directly next content item in the session is less than a predetermined duration of time. The processor 2504 can be configured to rank content items in a content item-base, based on a first (M-1) content items in the session, according to a likelihood of each content item in the content item-base to be consumed next. The processor 2504 can be configured to generate a session metric for each content item in the content item-base. The session metric can be a quotient of a rank of the content item divided by a number of content items in the content item-base. The processor 2504 can be configured to send the session metric to the recommender system to train the recommender system.

Ensembler Testing

Linear Ensembler Testing

Figure 26:
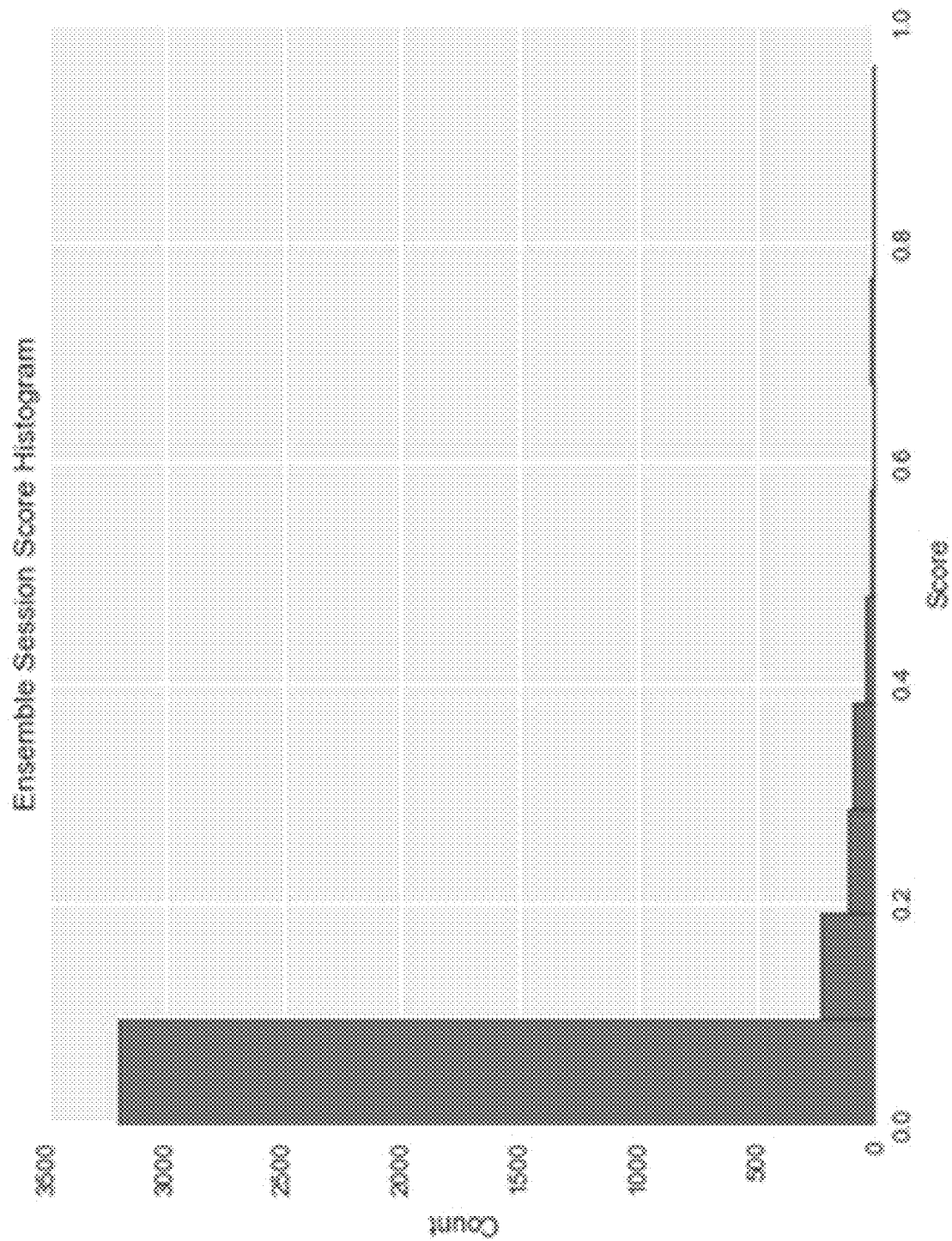
FIG. 26 is an example of an ensemble session score histogram.

In order to test a linear ensembler, first the weights for the recommenders can be cross validated. This can be done by determining the set of weights that minimize MPR. Finally, the session MPR of the full ensemble can be measured. Ensembled solution scores produced by systems disclosed herein can be sub 1 percentile. FIG. 26 is an example of an ensemble session score histogram.

Nonlinear Ensembler Testing

In order to test a nonlinear ensemble, sessions can be constructed as described above.

For a session, the expected state of the user can be tracked as well as a string of scalars that can describe the popularity (as well as some properties of its distribution), song release dates, and constructed acoustic properties.

An AUC of an ROC curve can be used to measure the efficacy of the nonlinear ensemble. The AUC can provide a probability that a randomly chosen positive sample (song not skipped or song liked) will be ranked higher than a randomly chosen negative sample (song skipped early or explicitly rejected).

Effective Popularity

Some users may almost exclusively prefer popular music, even when listening to categories of music that contain less popular music. Other users may have tastes that are much less popular. It can therefore be useful to measure this propensity and leverage the knowledge to provide an appropriate mix of popular and less-popular items accordingly.

Time Discount for Popularity

A recent listen can be more predictive of a future listen than a listen event from the past. In other words, there can be a past facing time discount for song listens.

This can be captured with an exponential decay:

popularity($t$)=exp($-\lambda(t-t_0)$)popularity($t_0$)

$\lambda$ can be computed via cross-validation, by computing an optimal $\lambda$ to predict a future (and out of sample) popularity of a song.

A useful property of this effective popularity can be that it can be updated at a time t_1 to a later time t_2 with the conversion factor:

time conversion scalar($t_2-t_1$)=exp($-\lambda(t_2-t_1)$)

Note that "effective popularity" or "time discounted popularity" can also be referred to as "popularity".

Parametric and Nonparametric-Based Popularity Modeling

For listeners with an entropy that indicates less popular tastes or users with a high number of listens, their popularity preference can be modeled with a Gaussian. An array of the total number of listens of a song can be maintained. The Gaussian can be defined by the mean of this distribution and its standard deviation.

$$prob(N) = \exp\left(-\frac{(N-\mu_u)^2}{2\sigma_u^2}\right)$$

This formula can represent the probability that song of popularity N is drawn by a user u, with mean popularity interest $\mu_u$ and variance $\sigma_u^2$.

As a final step before selecting a song to play or a seed to kick start a session, the system can draw a random number from a Gaussian representing the user indicated popularity of the next item to be drawn. A song can then be picked from the very top of the pool in accordance to this randomly drawn popularity number.

Alternatively, the nonlinear ensembler can be realized without a parameterized model as described above.

The popularity of songs previously played in a session, or generally by a user, and that of candidate songs can be directly included. The nonlinear ensembler, which can be based on gradient boosting, can balance song similarity to the current state of the user.

Data Bias

Users utilizing music streaming services can listen to songs due to the user's preference, the recommendation system, or both. The recommendation system can then be updated when a song recommended is actually listened to. Since the user may be given only a limited variety of choices, e.g., a user may not practically be expected to skip more than a handful of times, a recommender may run awry recommending only safe palatable options. Due to survivorship bias, users unhappy with their recommendations can be weeded out. Thus, there can be an imperative to intervene and keep track of user interest in familiarity vs. discovery.

Figure 27:
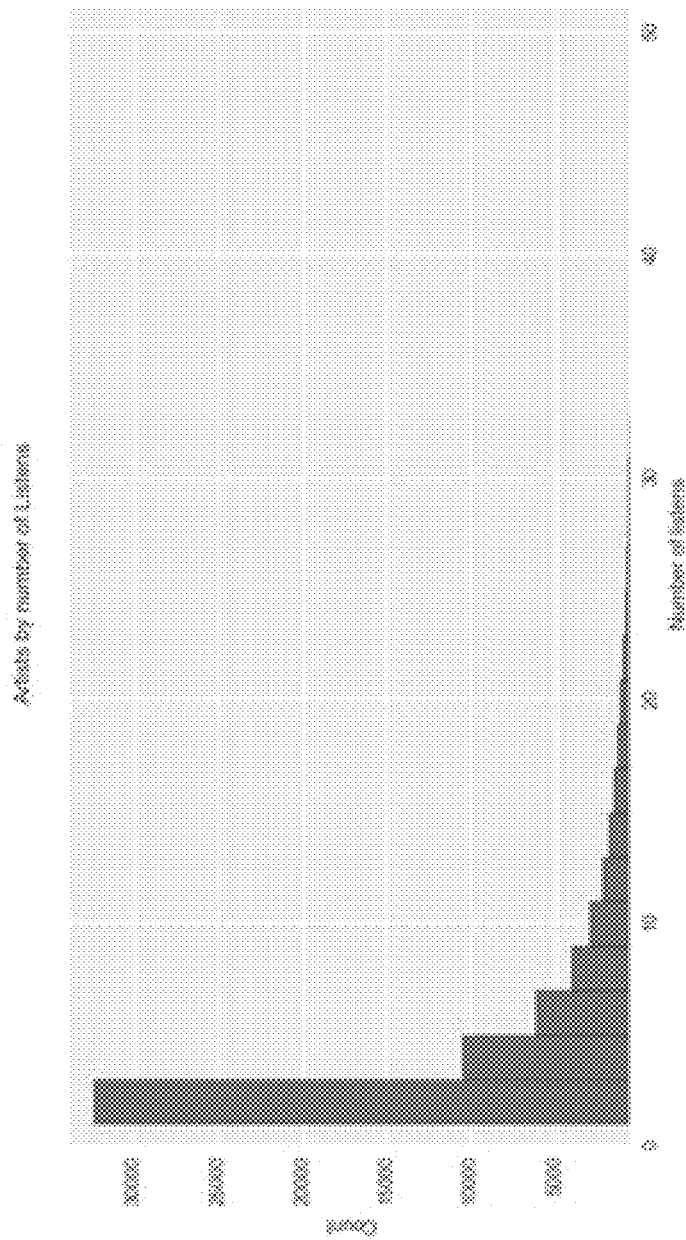
FIG. 27 is an example of a histogram of artists by number of listens.
Figure 28:
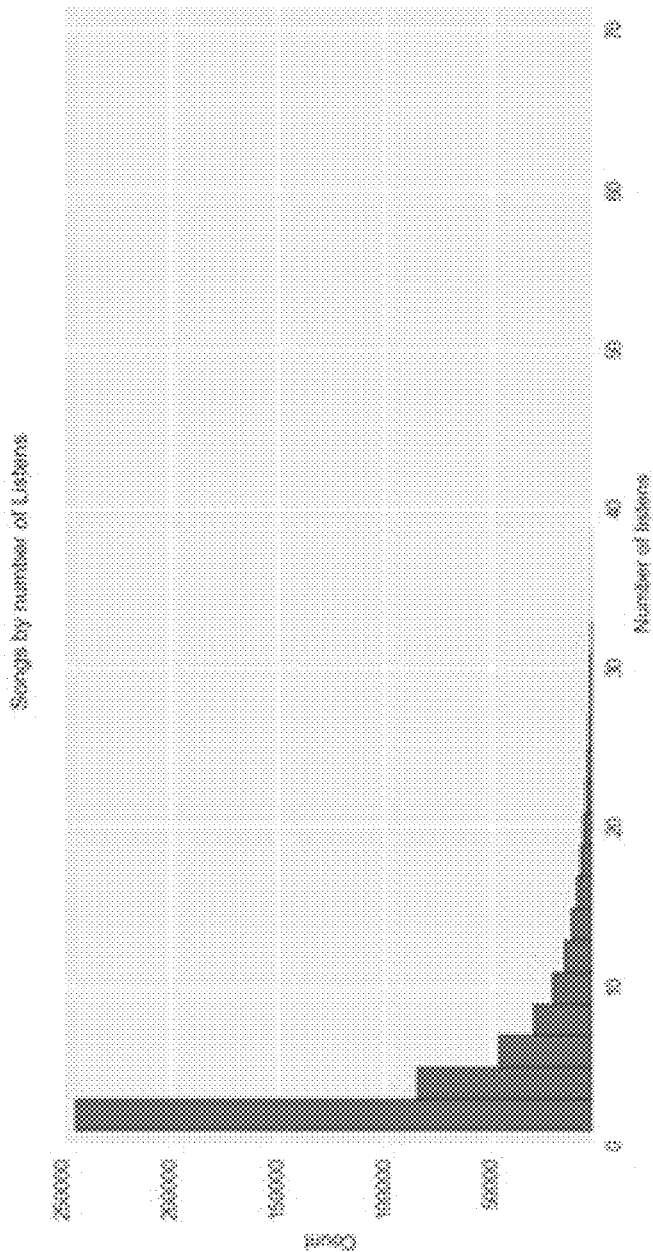
FIG. 28 is an example of a histogram of songs by number of listens.

FIG. 27 is an example of a histogram of artists by number of listens; FIG. 28 is an example of a histogram of songs by number of listens. As illustrated in FIGS. 27 and 28, artist and song listens can be power law distributed with a relatively small percentage of songs and artists dominating total listens.

Effective Entropy Score

An Effective Entropy Score (EES) can be used to measure user predilection for popular music. Users with less popular tastes, which can be determined by effective entropy, can effectively be given more songs from less popular artists.

The EES can be calculated by taking an array of the number listens of songs the user has listened to and multiplying the number of listens of a song with the number of listens of that song in the user-base. This can then be divided by the sum of this new array to produce an array of frequencies. Entropy can then be computed using the formula:

$$S = \sum_i f_i \log\left(\frac{1}{f_i}\right)$$

The sum can be over frequencies, $f_i$, indexed by i. Higher entropy users can have less popular tastes and lower entropy users can have more popular tastes. However, there can be an issue: as the user listens to more songs, the user may exhaust popular songs in the type of music the user may prefer. Increasing the number of listens of a subscriber to a music service can necessitate that users explore less popular options. Thus, they can move towards less popular songs and their entropy can necessarily increase.

Effective entropy can adjust for the total number of listens by performing a linear regression of the user entropy vs. the total number of listens across users to compute beta—the regression coefficient that can determine the rate that entropy can decrease as a function of total listens. Thus, $\beta N$ can be added in order to account for this effect:

$$EES = S + \beta N$$

Figure 29:
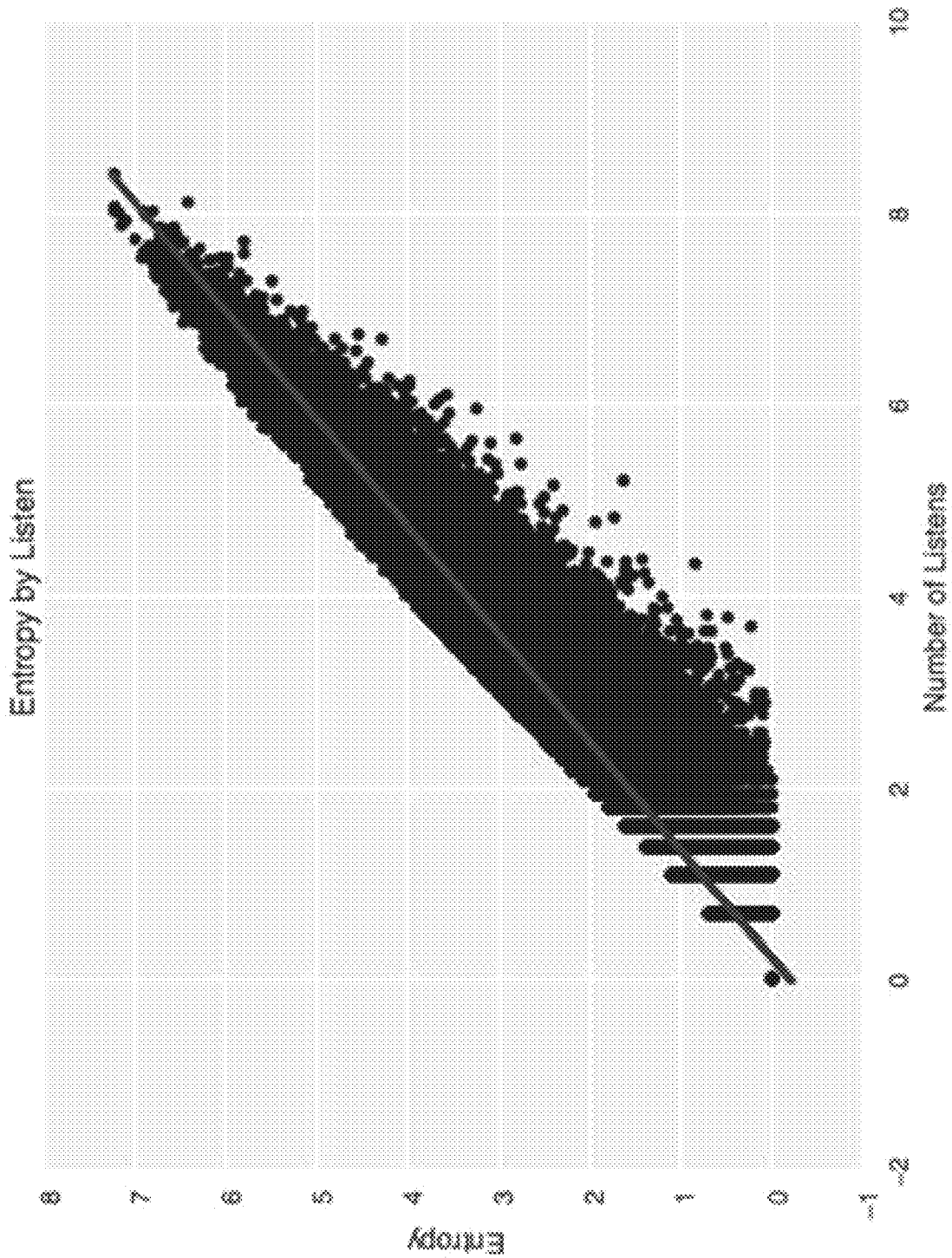
FIG. 29 is a graph of an example of a regression to adjust entropy by number of listens.
Figure 30:
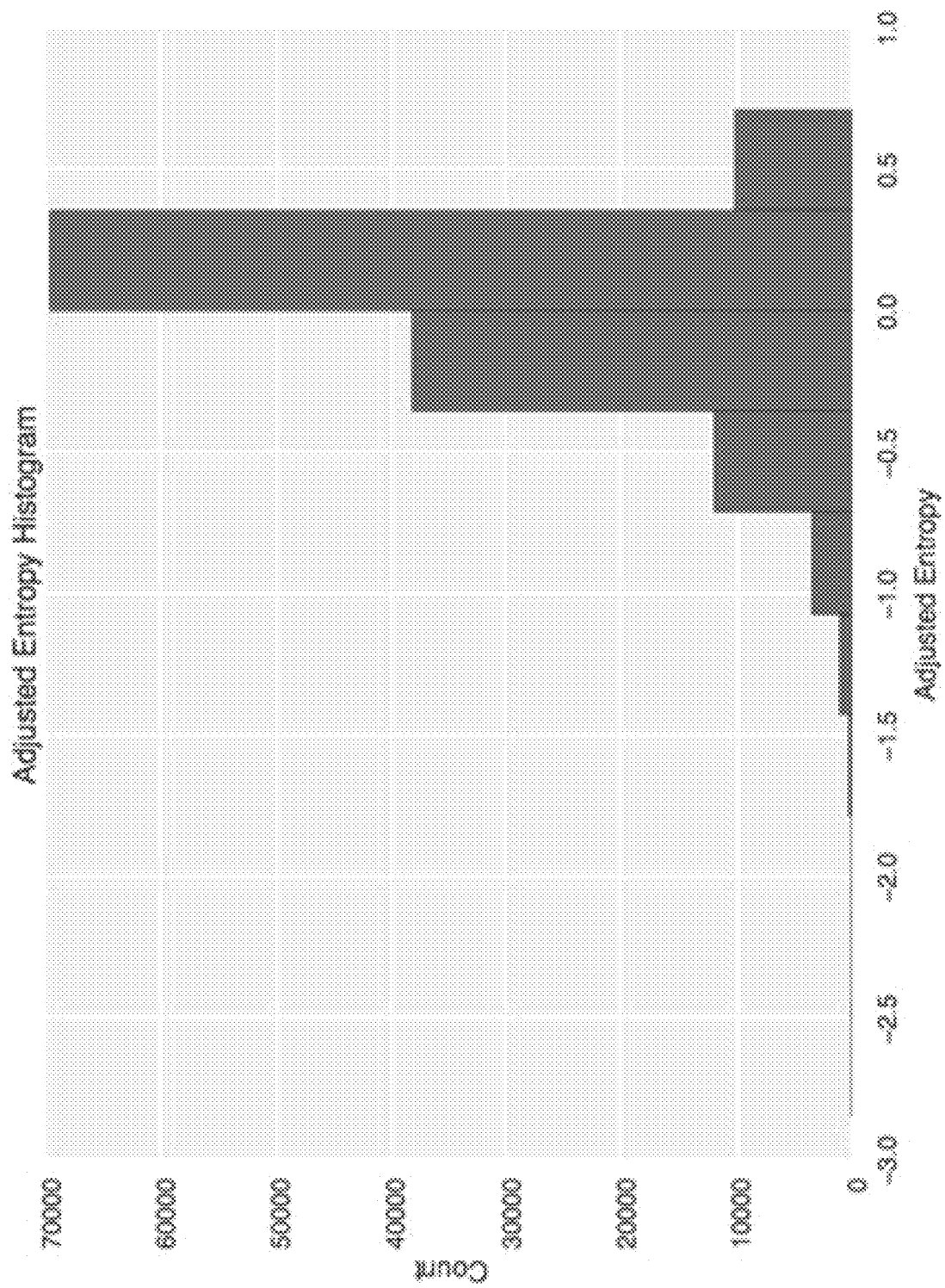
FIG. 30 is an example of an adjusted entropy histogram.

FIG. 29 is a graph of an example of a regression to adjust entropy by number of listens; FIG. 30 is an example of an adjusted entropy histogram. As illustrated in FIG. 30, many, but not all, users may have a preference for more popular music—lower entropy. However, a number of users may also prefer less popular music—higher entropy.

Various implementations for evaluating a performance of a recommender system can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for evaluating the performance of the recommender system. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for evaluating the performance of the recommender. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general-purpose microprocessor and/or an application-specific integrated circuit (ASIC) that implements all or part of the techniques according to implementations in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for evaluating the performance of the recommender system.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for evaluating a performance of a recommender system, comprising:

identifying, at a processor of the recommender system, a session of M content items consumed by a user, wherein the session is a sequence of the M content items defined such that, for each of a first (M-1) content items in the session, a delay time between a completion of consumption of one of the first (M-1) content items and a commencement of consumption of a directly next content item in the session is less than a predetermined duration of time, M being greater than two;

ranking, at the processor, the M content items in the session based on a measure associated with a first (M-2) content items in the session, a content item, of the content items, having a corresponding vector representation, the measure being a vector representation of a sum of vector representations for the first (M-2) content items, a rank based on a degree of a match, for the each content item, between the vector representation of the sum of the vector representations for the first (M-2) content items and the corresponding vector representation;

producing, at the processor, a predicted rank of an (M-1)th content item in the session based on a last (M-2) content items in the session;

generating, at the processor, a session metric, the session metric being a quotient of the predicted rank of the (M-1)th content item divided by a number N of content items in a content item-base, N being greater than or equal to M;

using, at the processor, the session metric to quantify, for each recommender sub-system of the recommender system, a quality of a recommendation produced by a recommender sub-system;

adjusting, at the processor and based on the session metric, a weight applied to an output of the recommender sub-system;

repeating, at the processor and for at least one other session, the identifying, the ranking, the producing, the generating, the using, and the adjusting at least until the session metric is at a minimal value between 0 and 1, wherein the minimal value being between 0 and 0.5 is indicative that the predicted rank of the (M-1)th content item is near a top of a rank of the M content items, the minimal value realized without any user personalization information, and the session metric being used by the processor to weight combined recommendations from the recommender sub-systems; and producing, by the processor and after the minimal value has been realized, an output of the recommender system, the output of the recommender system being a recommended content item.

2. The method of claim 1, wherein the content items are songs.

3. The method of claim 1, wherein the adjusting the weight applied to the output of the recommender sub-system is in response to the session metric being less than a threshold.

4. The method of claim 1, further comprising receiving a content item consumption history of the user.

5. The method of claim 1, wherein the processor weights combined recommendations from at least one selected from the group consisting of: dynamic sub-systems, offline sub-systems, and pooling sub-systems.

6. A non-transitory computer-readable medium storing computer code for controlling a processor of a recommender system to cause the processor to evaluate a performance of the recommender system, the computer code including instructions to:
   identify a session of M content items consumed by a user, wherein the session is a sequence of the M content items defined such that, for each of a first (M-1) content items in the session, a delay time between a completion of consumption of one of the first (M-1) content items and a commencement of consumption of a directly next content item in the session is less than a predetermined duration of time, M being greater than two;
   rank the M content items in the session based on a measure associated with a first (M-2) content items in the session, a content item, of the content items, having a corresponding vector representation, the measure being a vector representation of a sum of vector representations for the first (M-2) content items, a rank based on a degree of a match, for the each content item, between the vector representation of the sum of the vector representations for the first (M-2) content items and the corresponding vector representation;
   producing a predicted rank of an (M-1)th content item in the session based on a last (M-2) content items in the session;
   generate a session metric, the session metric being a quotient of the predicted rank of the (M-1)th content item divided by a number N of content items in a content item-base, N being greater than or equal to M;
   use the session metric to quantify, for each recommender sub-system of the recommender system, a quality of a recommendation produced by a recommender sub-system;
   adjust, based on the session metric, a weight applied to an output of the recommender sub-system;
   repeat, for at least one other session, the instructions to identify, rank, produce, generate, use, and adjust at least until the session metric is at a minimal value between 0 and 1, wherein the minimal value being between 0 and 0.5 is indicative that the predicted rank of the (M-1)th content item is near a top of a rank of the M content items, the minimal value realized without any user personalization information, and the session metric being used by the processor to weight combined recommendations from the recommender sub-systems; and
   produce, after the minimal value has been realized, an output of the recommender system, the output of the recommender system being a recommended content item.

7. A system for evaluating a performance of a recommender system, comprising:
   a memory configured to store a content item consumption history of a user; and
   a processor of the recommender system configured to:
      identify a session of M content items consumed by the user, wherein the session is a sequence of the M content items,
      rank the M content items in the session, based on a measure associated with a first (M-2) content items in the session, a content item, of the content items, having a corresponding vector representation, the measure being a vector representation of a sum of vector representations for the first (M-2) content items, a rank based on a degree of a match, for the each content item, between the vector representation of the sum of the vector representations for the first (M-2) content items and the corresponding vector representation,
      produce a predicted rank of an (M-1)th content item, based on a last (M-2) content items in the session,
      generate a session metric, the session metric being a quotient of the predicted rank of the (M-1)th content item divided by a number of content items in a content item-base, N being greater than or equal to M,
      use the session metric to the recommender system to quantify, for each recommender sub-system of the recommender system, a quality of a recommendation produced by a recommender sub-system,
      adjust, based on the session metric, a weight applied to an output of the recommender sub-system,
      repeat, for at least one other session, operations to identify, rank, produce, generate, use, and adjust at least until the session metric is at a minimal value between 0 and 1, wherein the minimal value being between 0 and 0.5 is indicative that the predicted rank of the (M-1)th content item is near a top of a rank of the M content items, the minimal value realized without any user personalization information, wherein the session is defined such that, for each of the first (M-1) content items in the session, a delay time between a completion of consumption of one of the first (M-1) content items and a commencement of consumption of a directly next content item in the session is less than a predetermined duration of time, M being greater than two, and the session metric is used by the processor to weight combined recommendations from the recommender sub-systems; and
      produce, after the minimal value has been realized, an output of the recommender system, the output of the recommender system being a recommended content item.

* * * * *